(12) United States Patent
Kasami

(10) Patent No.: US 7,907,674 B2
(45) Date of Patent: *Mar. 15, 2011

(54) ORTHOGONAL FREQUENCY DIVISION MULTIPLEXING (OFDM) SIGNAL RECEIVER HAVING REDUCED POWER CONSUMPTION

(75) Inventor: Hideo Kasami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 733 days.

This patent is subject to a terminal disclaimer.

(21) Appl. No.: 11/858,778

(22) Filed: Sep. 20, 2007

(65) Prior Publication Data

US 2008/0192866 A1 Aug. 14, 2008

(30) Foreign Application Priority Data

Feb. 14, 2007 (JP) .................................. 2007-033870

(51) Int. Cl.
H04K 1/10 (2006.01)
(52) U.S. Cl. ...................................................... 375/260
(58) Field of Classification Search .................. 375/260
See application file for complete search history.

(56) References Cited

U.S. PATENT DOCUMENTS

| | | | |
|---|---|---|---|
| 6,269,132 B1 * | 7/2001 | Yonge, III ...................... | 375/346 |
| 6,563,862 B1 * | 5/2003 | Knutson et al. ................ | 375/219 |
| 2005/0250452 A1 * | 11/2005 | Walton et al. ................. | 455/63.4 |
| 2006/0215590 A1 * | 9/2006 | Sharma et al. ................. | 370/311 |
| 2007/0121491 A1 * | 5/2007 | Kaiki ............................. | 370/222 |

FOREIGN PATENT DOCUMENTS

| | | |
|---|---|---|
| EP | 1071221 A1 * | 1/2001 |
| JP | 2001-69023 | 3/2001 |
| JP | 2001-251275 | 9/2001 |
| JP | 2006-246364 | 9/2006 |

OTHER PUBLICATIONS

U.S. Appl. No. 11/619,385, filed Jan. 3, 2007.
U.S. Appl. No. 11/531,190, filed Sep. 12, 2006.
U.S. Appl. No. 11/387,966, filed Mar. 24, 2006.
U.S. Appl. No. 11/268,657, filed Nov. 8, 2005.
Hideo Kasami et al., "*A filterbank based equalization technique for OFDM systems with insufficient guard interval*", 2005 IEICE Society Conference B-5-71, 1 page.
Office Action corresponding to Japanese Patent Application No. 2007-033870 dated Oct. 14, 2008.

* cited by examiner

*Primary Examiner* — Juan A Torres
(74) *Attorney, Agent, or Firm* — Ohlandt, Greeley, Ruggiero & Perle, L.L.P.

(57) ABSTRACT

A signal reception apparatus is provided that includes an antenna which receives an orthogonal frequency division multiplexing (OFDM) signal, a unit to perform frequency conversion on the received OFDM signal to obtain a converted OFDM signal, a unit to perform analog-to-digital (A/D) conversion on the converted OFDM signal to obtain a first digital OFDM signal, a unit to set a first interval of one OFDM symbol interval of the OFDM signal, a unit to demodulate an OFDM symbol from a second digital OFDM signal corresponding to the first interval, the second digital OFDM signal being included in the first digital signal, and a unit to control power supply to the frequency conversion unit and the A/D conversion unit in the first interval, and stop the power supply to at least one of the frequency conversion unit and the A/D conversion unit in a second interval other than the first interval.

19 Claims, 21 Drawing Sheets

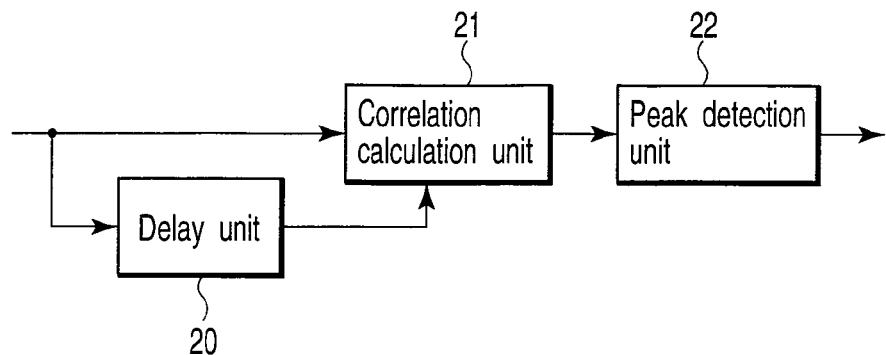
F I G. 2
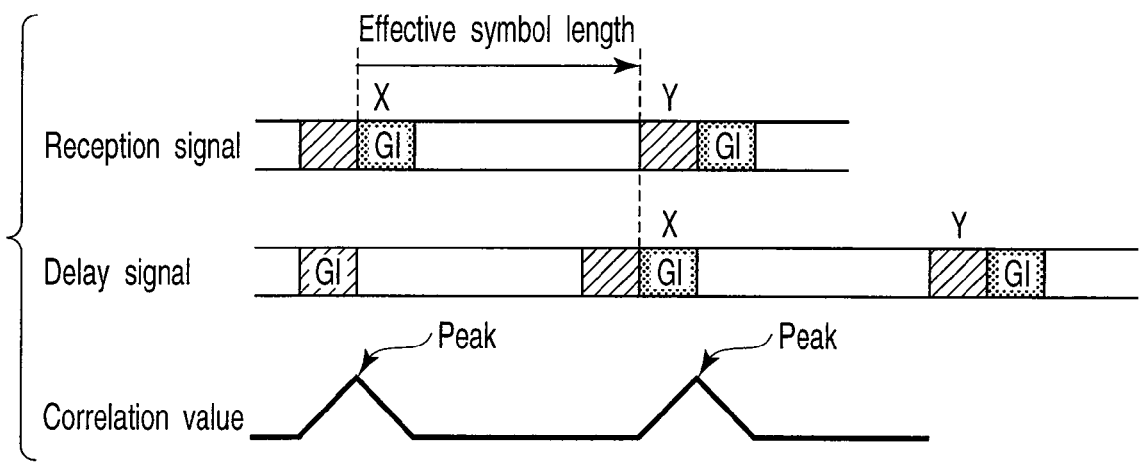
F I G. 3
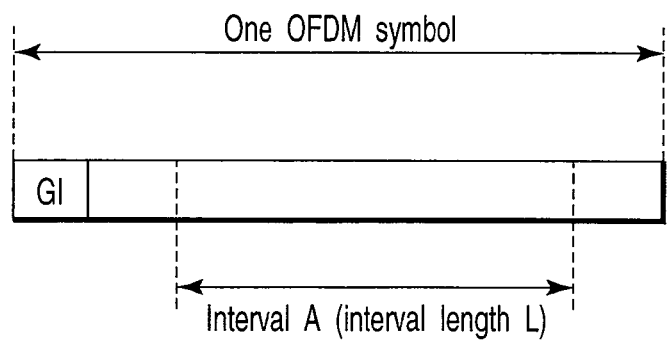
F I G. 4

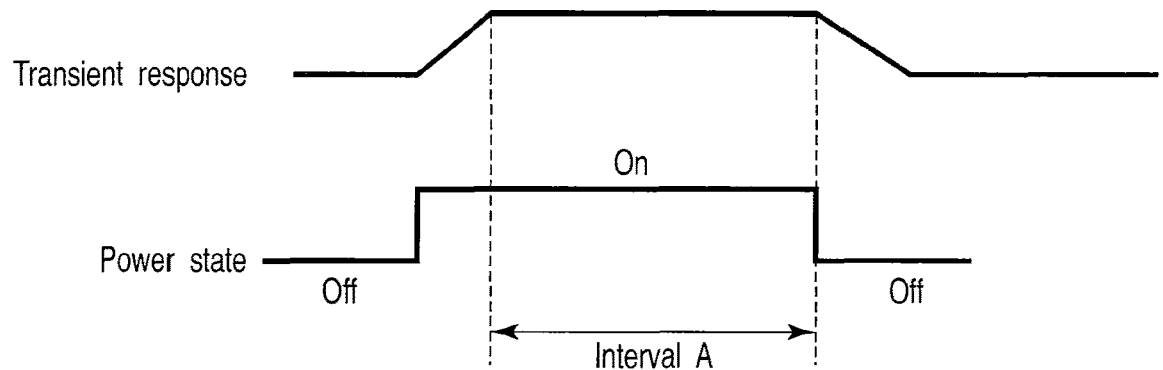
F I G. 7

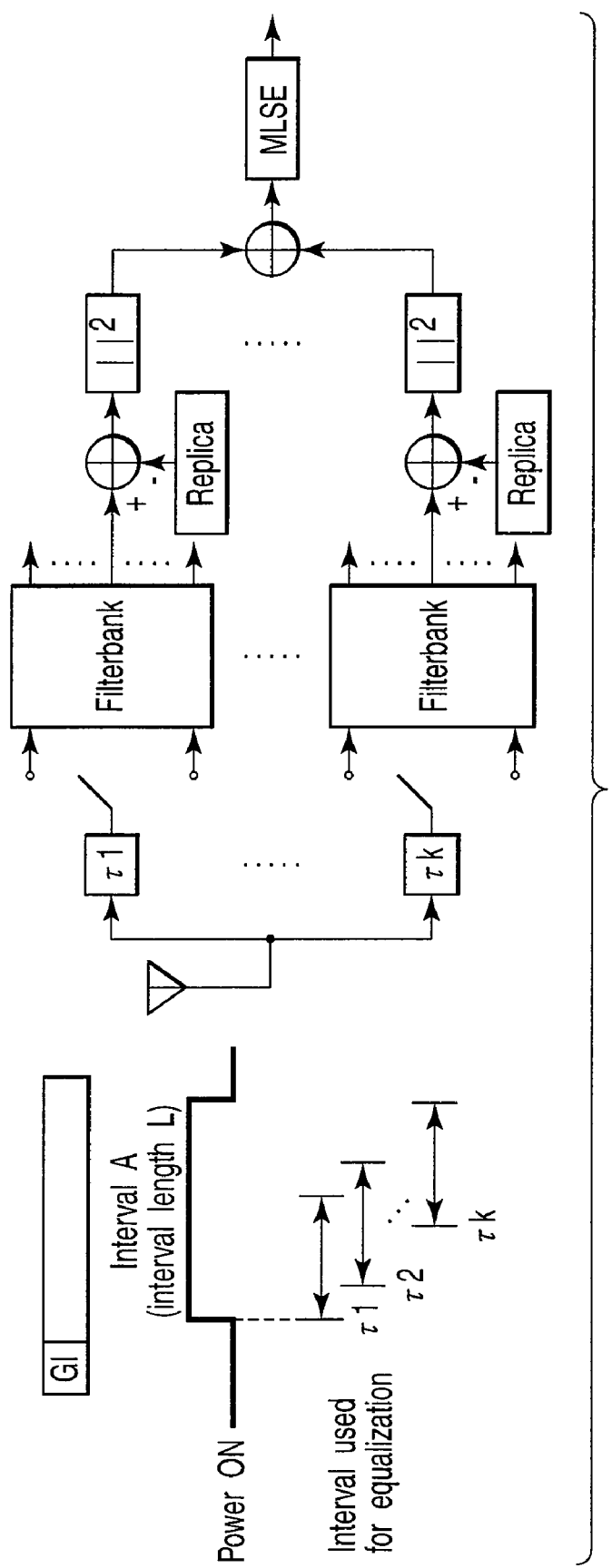
F I G. 9

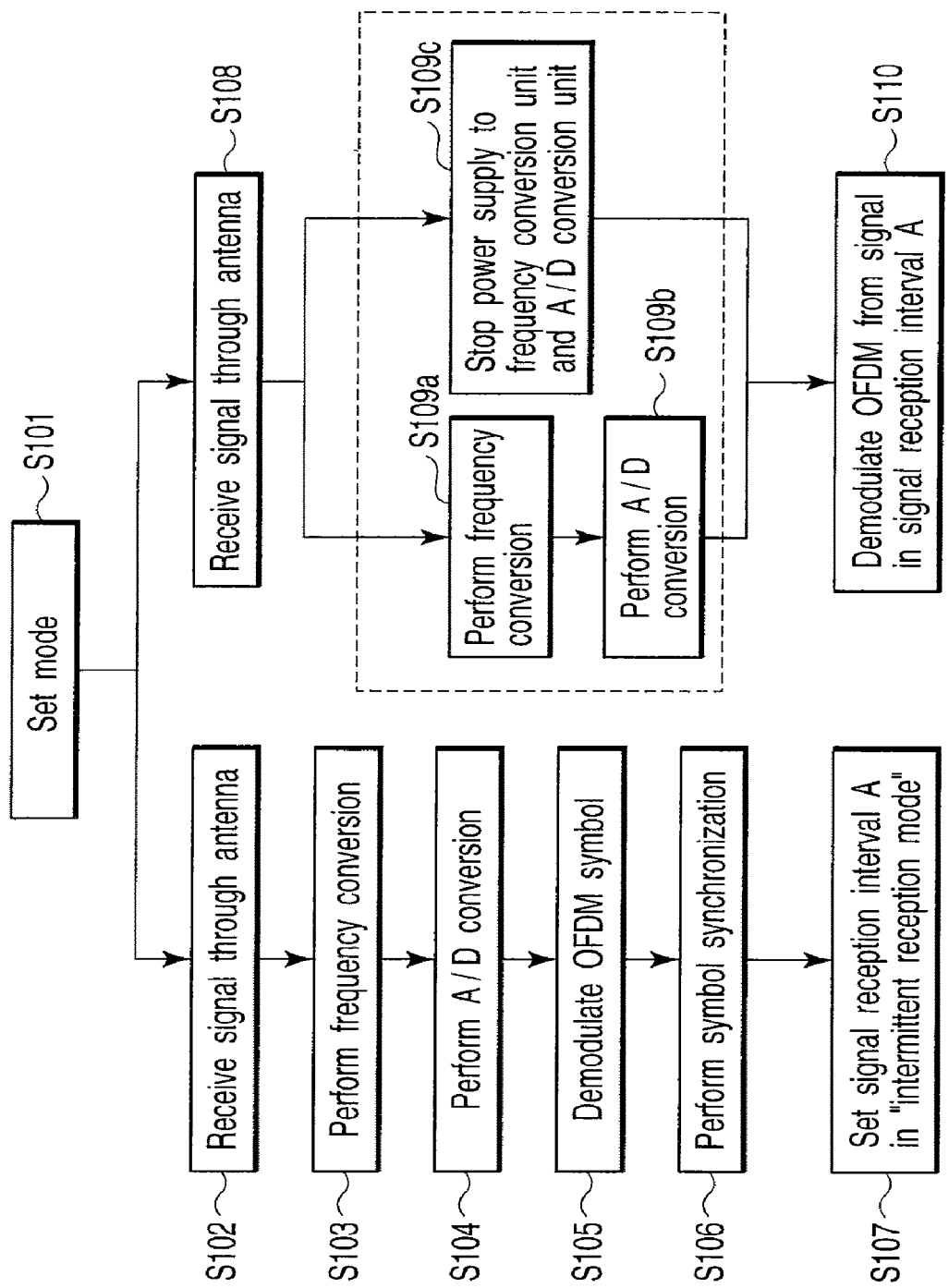
F I G. 13

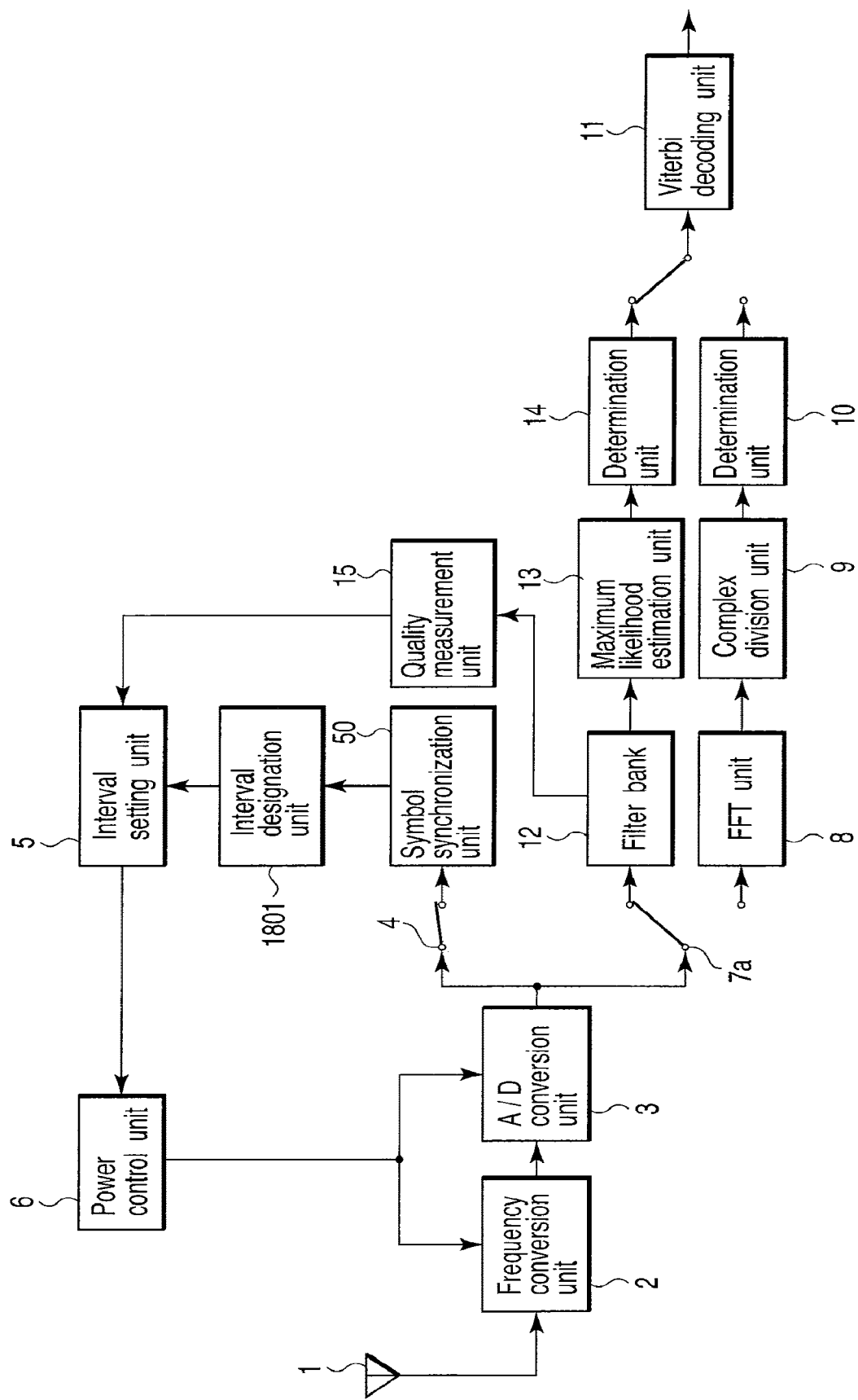
F I G. 18

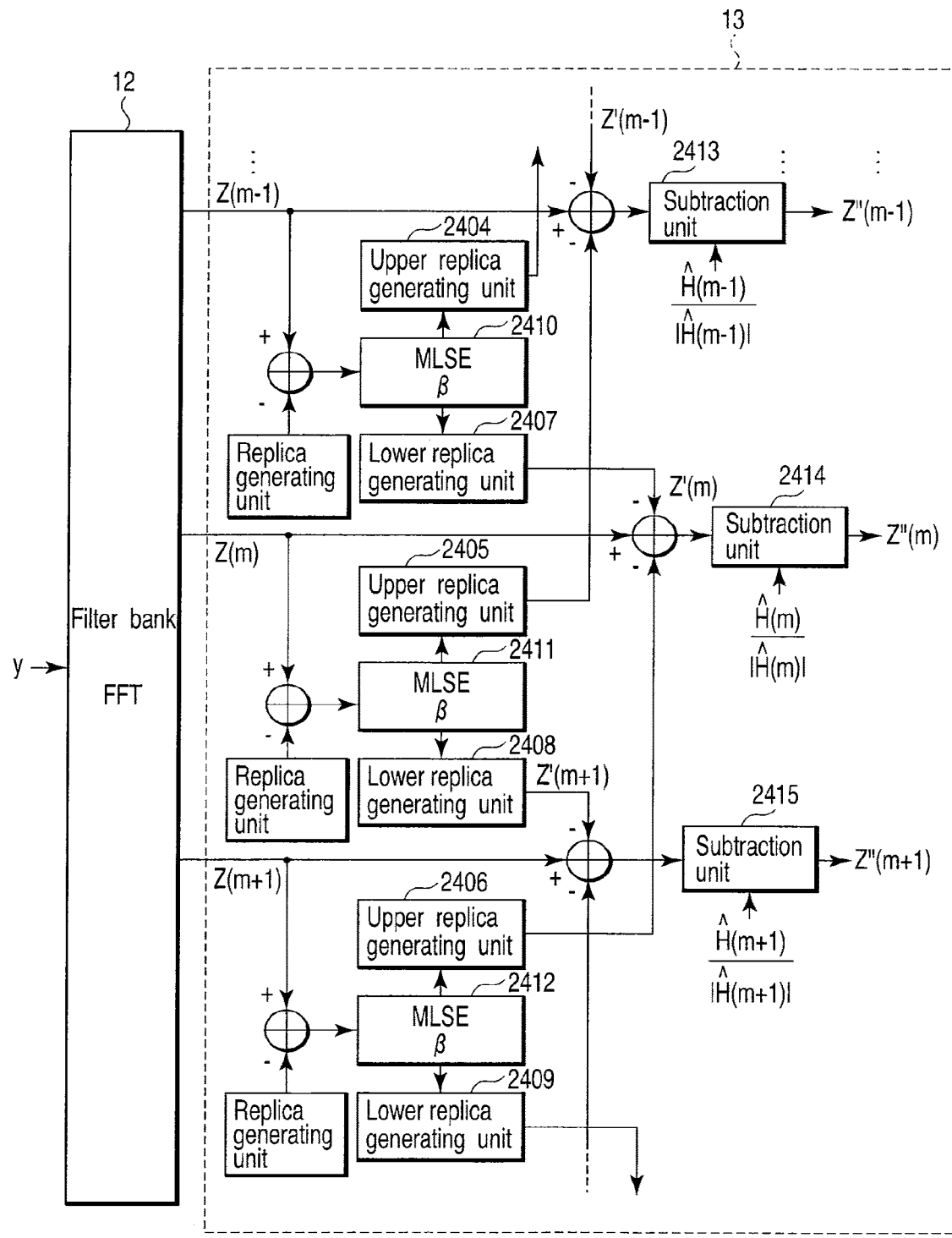
F I G. 2 4

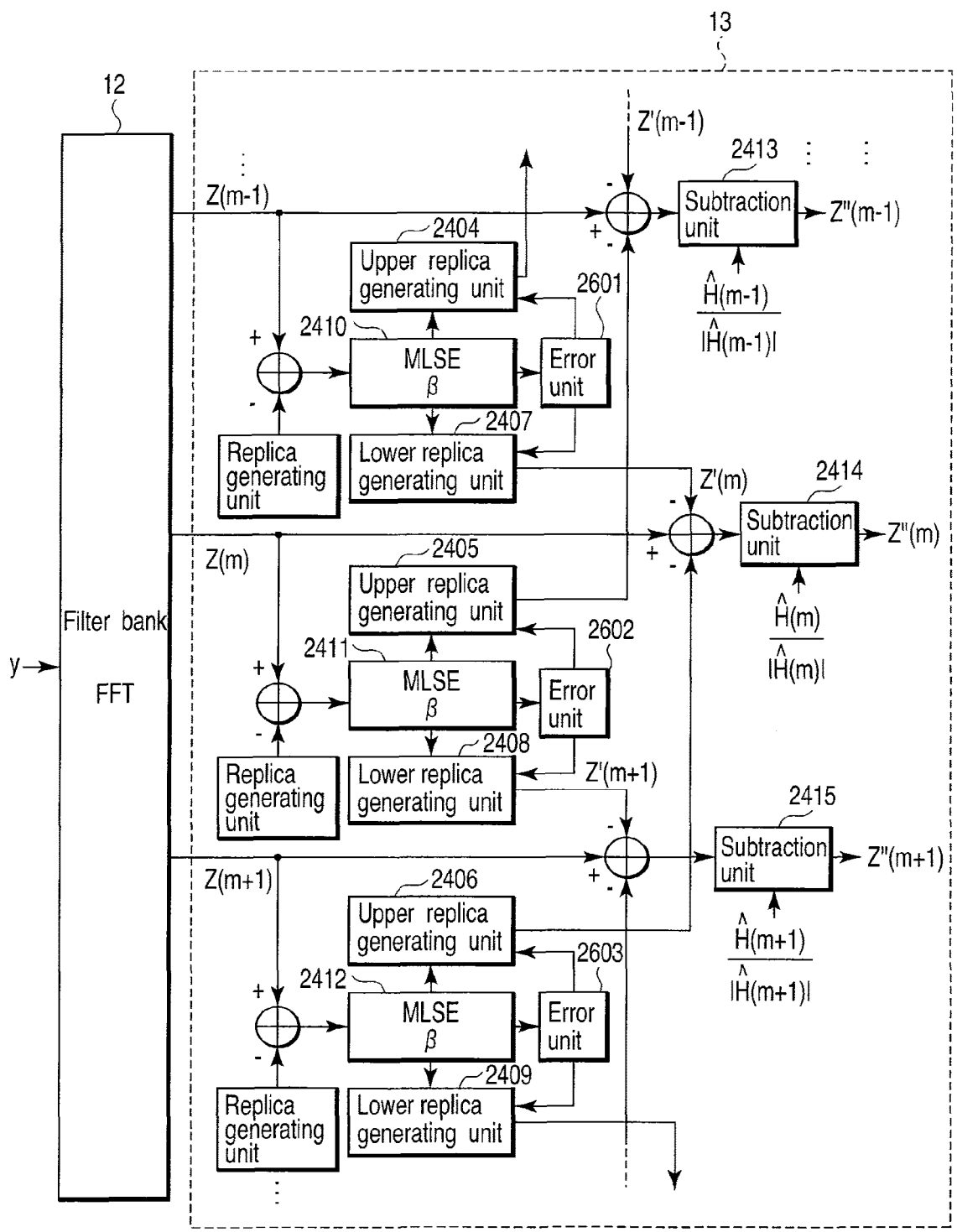
F I G. 26

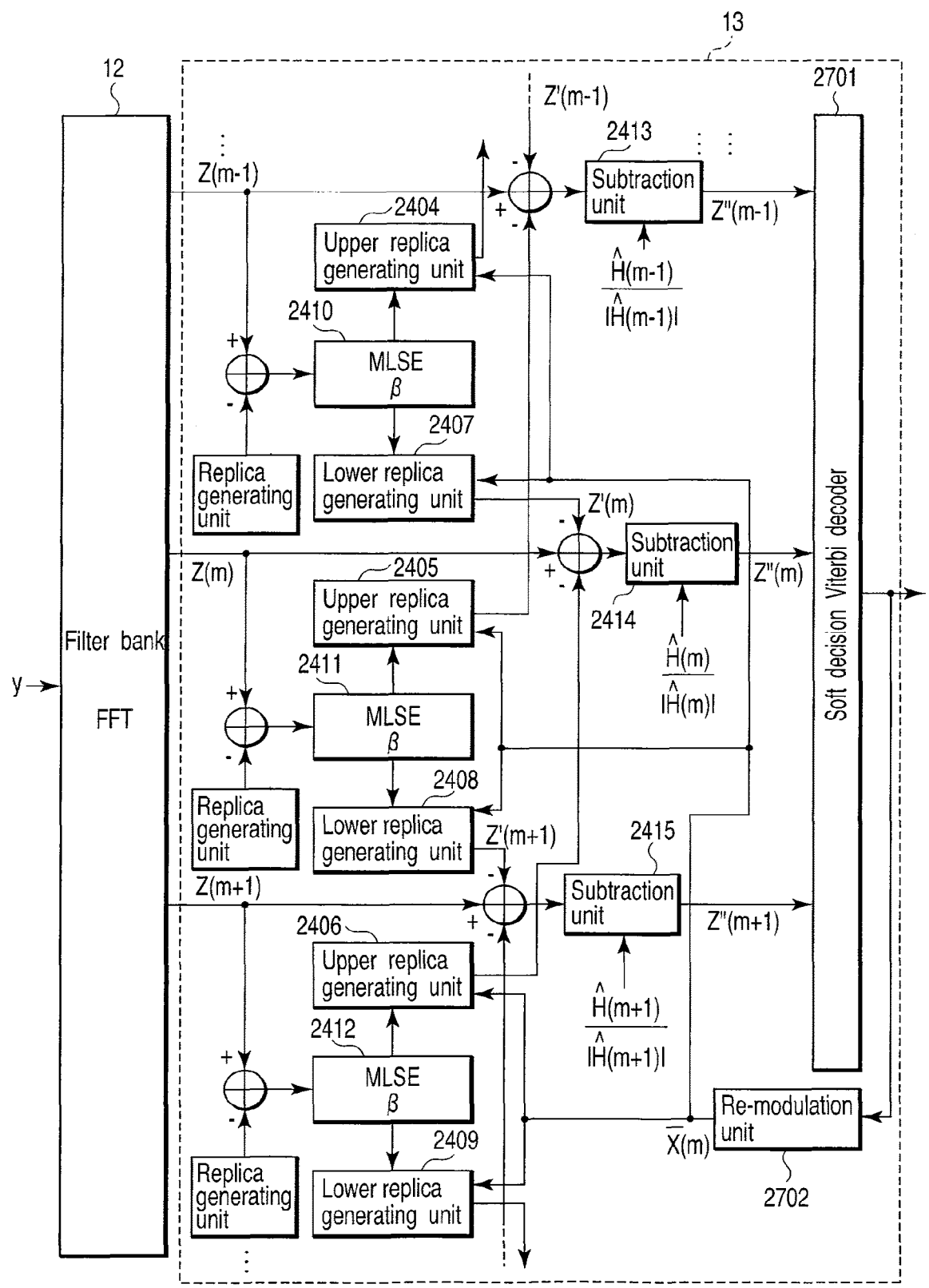
F I G. 27

ORTHOGONAL FREQUENCY DIVISION MULTIPLEXING (OFDM) SIGNAL RECEIVER HAVING REDUCED POWER CONSUMPTION

CROSS-REFERENCE TO RELATED APPLICATIONS

This application is based upon and claims the benefit of priority from prior Japanese Patent Application No. 2007-033870, filed Feb. 14, 2007, the entire contents of which are incorporated herein by reference.

BACKGROUND OF THE INVENTION

1. Field of the Invention

The present invention relates to a signal reception apparatus and, more particularly, to a signal reception apparatus which can reduce power consumption when receiving radio signals.

2. Description of the Related Art

As a method of reducing the power consumption of a signal reception apparatus which receives radio signals, there has been proposed a method in which when a signal transmission apparatus is to transmit a plurality of data in a time-division manner, information concerning the arrangement (data position) of data to be transmitted is inserted in the head of a frame to allow a signal reception apparatus to receive only necessary data on the basis of the information concerning the data position (see, for example, JP-A 2001-69023 (KOKAI) (p. 4, FIG. 1)). This method allows the signal reception apparatus to stop the receiving operation at the timing of receiving unnecessary data, and hence can reduce power consumption.

The above technique can be used only for data transmission/reception in a case wherein data transmitted from the transmitting side are to be selectively received. For example, this technique cannot be applied to a case wherein it is necessary to receive all transmitted data.

BRIEF SUMMARY OF THE INVENTION

According to an aspect of the invention, there is provided a signal reception apparatus comprising: an antenna which receives an OFDM (Orthogonal Frequency Division Multiplex) signal; a frequency conversion unit configured to perform frequency conversion on the received OFDM signal to obtain a converted OFDM signal; an A/D conversion unit configured to perform analog-to-digital conversion on the converted OFDM signal to obtain a first digital OFDM signal; a setting unit configured to set a first interval of one OFDM symbol interval of the OFDM signal; a demodulation unit configured to demodulate an OFDM symbol from a second digital OFDM signal corresponding to the first interval, the second digital OFDM signal being included in the first digital signal; and a power control unit configured to control power supply to the frequency conversion unit and the A/D conversion unit in the first interval, and stop the power supply to at least one of the frequency conversion unit and the A/D conversion unit in a second interval other than the first interval.

BRIEF DESCRIPTION OF THE SEVERAL VIEWS OF THE DRAWING

FIG. 2 is a block diagram showing the arrangement of a symbol synchronization unit in the first embodiment;
FIG. 3 is a view showing a symbol synchronization method in the first embodiment;
FIG. 4 is a view showing a signal reception interval in one OFDM symbol in the first embodiment;
FIG. 7 is a is a view showing a power supply control method in the first embodiment;
FIG. 9 is a view showing an example of a method of demodulating an original signal in the first embodiment;
FIG. 13 is a flowchart showing the operation of the first embodiment;
FIG. 18 is a block diagram showing the arrangement of a signal reception apparatus according to the sixth embodiment;
FIG. 24 is a block diagram showing the arrangement of an MLSE equalizer which performs high-performance signal processing according to the sixth embodiment;
FIG. 26 is a block diagram showing the arrangement of an MLSE equalizer which performs high-performance signal processing according to the first modification of the sixth embodiment;
FIG. 27 is a block diagram showing the arrangement of an MLSE equalizer which performs high-performance signal processing according to the second modification of the sixth embodiment.

DETAILED DESCRIPTION OF THE INVENTION

Figure 1:
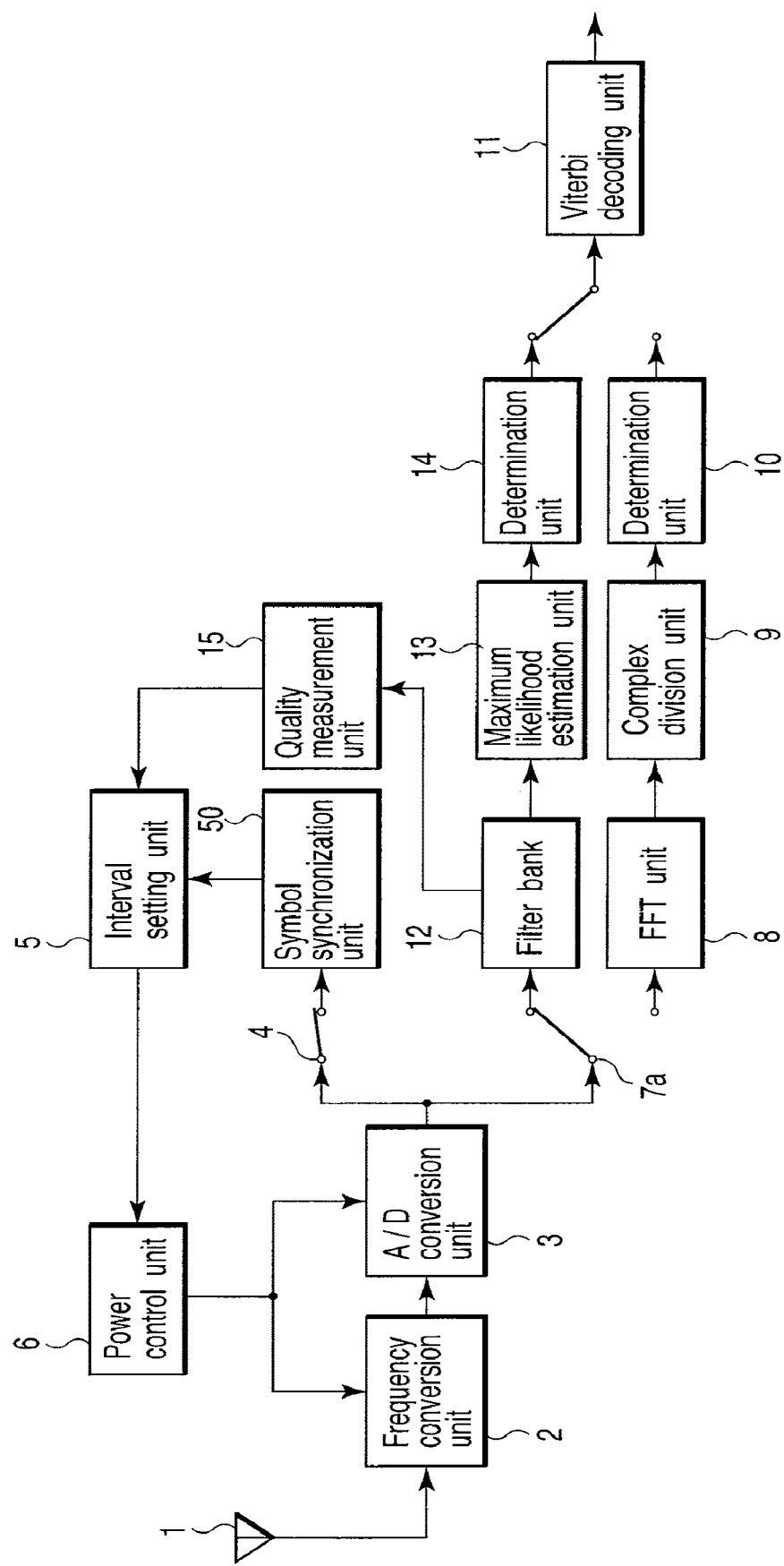
FIG. 1 is a block diagram showing the arrangement of a signal reception apparatus according to the first embodiment.

A signal reception apparatus according to embodiments will be described in detail below with reference to the views of the accompanying drawing. Note that components denoted by the same reference numerals perform similar operations in the following embodiments, and a repetitive description will be omitted.

Those embodiments provide a signal reception apparatus which receives an OFDM (Orthogonal Frequency Division Multiplexing) signal corresponding to a partial interval of an OFDM symbol, and demodulates an original symbol from the received OFDM signal portion to stop the receiving operation in an interval in which no signal is received, thereby achieving a reduction in power consumption.

First Embodiment

A signal reception apparatus according to the first embodiment will be described. The signal reception apparatus according to the first embodiment has a "continuous reception mode" and an "intermittent reception mode". In the "continuous reception mode", the apparatus always receives radio signals and demodulates the signals. In the "intermittent reception mode", the apparatus intermittently receives radio signals and demodulates original signals from signals in time intervals in which the apparatus have received the signals. In the time intervals in which the signal reception apparatus receives no signals, the apparatus stops power supply to part of the apparatus to achieve a reduction in power consumption. An interval setting unit 5 switches between the "continuous reception mode" and the "intermittent reception mode". The mode switching operation of the interval setting unit 5 and operation of each unit in each mode will be described in detail later.

FIG. 1 is a block diagram showing the arrangement of the signal reception apparatus according to the first embodiment. The arrangement and operation of the signal reception apparatus according to the first embodiment will be described below with reference to FIG. 1.

A frequency conversion unit 2 converts the OFDM signal received by an antenna 1 into an IF signal or a baseband signal. An A/D conversion unit 3 then converts the analog signal to a digital signal.

A symbol synchronization unit 50 receives the digital signal converted by the A/D conversion unit 3 through a switch 4 in the "continuous reception mode". The symbol synchronization unit 50 synchronizes with an OFDM symbol and generates a symbol synchronization signal.

FIG. 2 shows the arrangement of the symbol synchronization unit 50. The symbol synchronization unit 50 generates a symbol synchronization signal by using a reception signal in at least one OFDM symbol interval. That is, the symbol synchronization unit 50 causes a delay unit 20 to delay the reception signal by an effective symbol time, and causes a correlation calculation unit 21 to calculate the correlation value between the reception signal and the delay signal. The correlation calculation unit 21 calculates a correlation value at each time by using a signal in the interval between the time and a time going back to the past by a time interval equal to the guard interval (GI) of the OFDM signal. In this case, since one OFDM symbol contains a guard interval (an interval "X" in FIG. 3) and an interval (an interval "Y" in FIG. 3) containing the same data as that in the guard interval, when the correlation calculation unit 21 calculates the correlation value between the reception signal and the delay signal, peaks periodically appear in the correlation value, as shown in FIG. 3. Detecting a peak using a peak detection unit 22 makes it possible to know the start position of each OFDM symbol. The peak detection unit 22 generates a symbol synchronization signal by using a detected peak. Note that such symbol synchronization is performed in the "continuous reception mode" but is not performed in the "intermittent reception mode".

As shown in FIG. 4, the interval setting unit 5 sets an interval "A", of the OFDM symbol interval, in which an OFDM signal should be received, on the basis of the symbol synchronization signal generated by the symbol synchronization unit 50. An interval length "L" of the interval "A" is set to be equal to or more than ½ interval length of an interval, of one OFDM symbol interval, which excludes a guard interval. This is because, in signal demodulation processing to be described later, a signal is demodulated by using a signal in an interval having a length ½ the effective symbol length. An interval setting method will be described later.

The interval setting unit 5 also switches between the "continuous reception mode" of continuously receiving OFDM signals and the "intermittent reception mode" of intermittently receiving OFDM signals.

In the "continuous reception mode", a power control unit 6 always keeps the frequency conversion unit 2 and the A/D conversion unit 3 in the ON state (in which power is supplied). The switch 4 then connects to the symbol synchronization unit 50 to cause it to continuously update symbol synchronization or to cause the interval setting unit 5 to continuously update the setting of the interval "A".

At this time, a switch 7a connects to an FFT (fast-Fourier transformation) unit 8. That is, the FFT unit 8 receives a signal through the A/D conversion unit 3, and converts the reception signal in an effective symbol interval to a signal in a frequency domain. A complex division unit 9 then receives an output signal from the FFT unit 8 and performs one-tap equalization processing by using a channel estimation value. A determination unit 10 performs bit determination processing, and a Viterbi decoding unit 11 performs error correction processing, thereby demodulating an original signal.

In the "intermittent reception mode", the power control unit 6 supplies power to the frequency conversion unit 2, the A/D conversion unit 3, and the like in the interval "A" to receive an OFDM signal. In an interval other than the interval "A", the power control unit 6 turns off power supply to at least parts of the frequency conversion unit 2 and A/D conversion unit 3 to stop receiving any OFDM signal.

Figure 5:
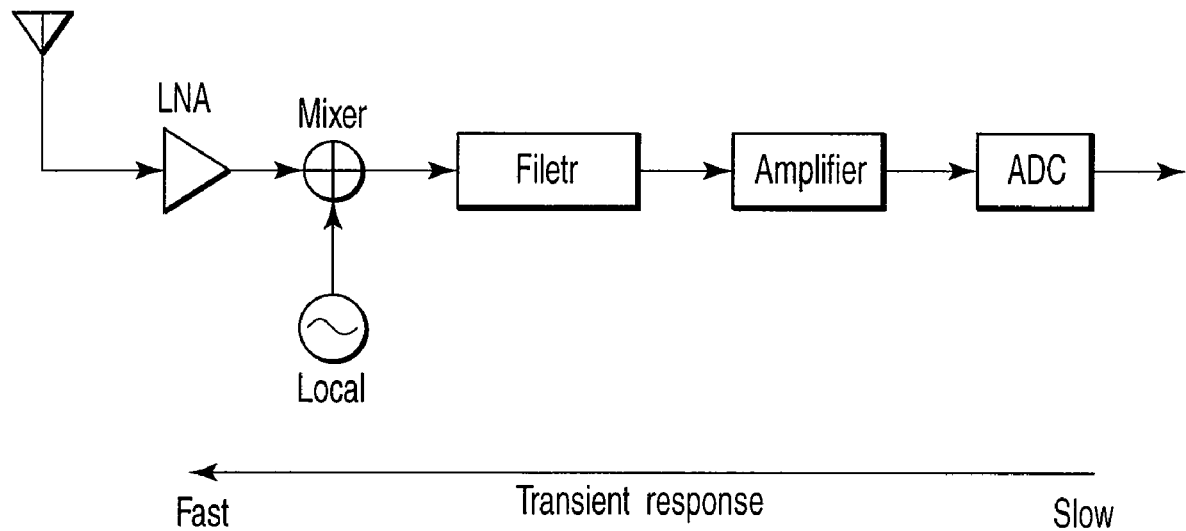
FIG. 5 is a view showing the speed of the transient response of each constituent element in the first embodiment.

In general, as shown in FIG. 5, a device designed to process a high-frequency signal has a faster transient response, and hence allows power supply to be kept off for a longer time. For example, an RF-band LNA (Low Noise Amplifier) or a mixer has a fast transient response, and a baseband amplifier has a slow transient response. For this reason, for example, it suffices to supply power to the LNA included in the frequency conversion unit 2 only in the intervals "A" and stop power supply in intervals other than the intervals "A". Always supplying power to other components (the amplifier and the like) regardless of intervals makes it possible to reduce the power consumption of the LNA and prevent the signal reception apparatus from operating unstably due to a transient response delay accompanying power supply switching.

Figure 6:
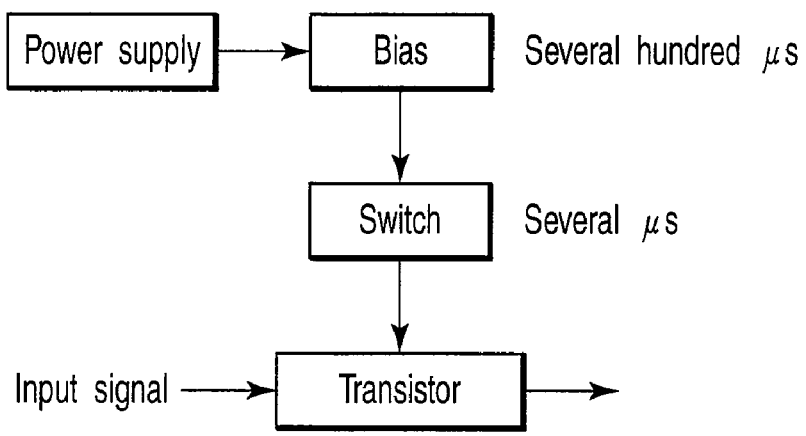
FIG. 6 is a view showing a power supply control method in the first embodiment.

In addition, since the transient response of a bias circuit is slow (in the order of several hundred μsec), it suffices to always supply power to the bias circuits of the frequency conversion unit 2 and A/D conversion unit 3 and stop power supply to the transistor circuits of these units in intervals other than the intervals "A". In this case, as shown in FIG. 6, it is preferable to switch power supply to the transistor circuit by switching a switch for an output from the bias circuit.

This apparatus then demodulates an original signal from the OFDM signal received in the interval "A" upon reducing the interference between OFDM subcarriers.

In this case, the power control unit 6 preferably switches power supply control at a timing earlier than the start of the interval "A", as shown in FIG. 7, in consideration of the transient response characteristics of analog units (the frequency conversion unit 2, the A/D conversion unit 3, and the like). In addition, it suffices to automatically measure the transient response characteristics of the analog units when the signal reception apparatus is powered on and to set a power ON timing on the basis of the measured transient response characteristics.

In the "intermittent reception mode", the switch 4 is released to inhibit the symbol synchronization unit 50 and interval setting unit 5 from performing symbol synchronization and interval setting.

Figure 8:
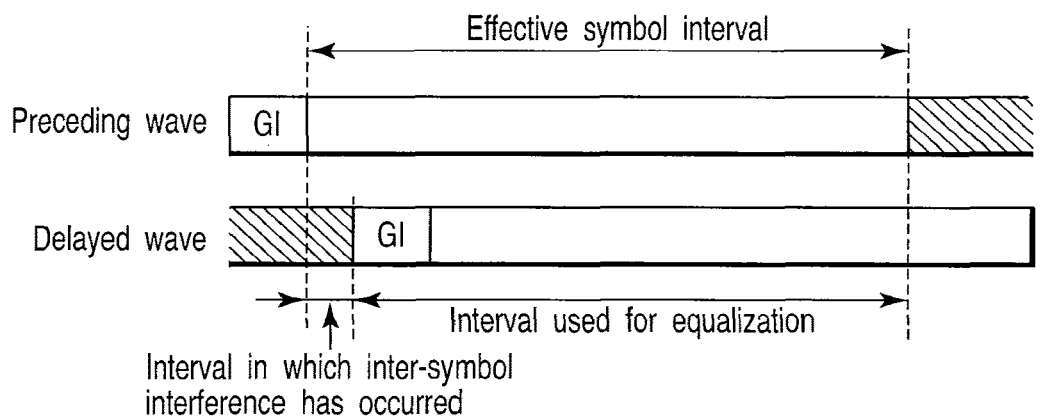
FIG. 8 is a view showing an example of a method of demodulating an original signal from part of an OFDM symbol.

In this case, as a method of demodulating an original signal by using a symbol portion of an OFDM symbol, for example, the method disclosed in Kasami et al., "A filter bank based equalization technique for OFDM systems with insufficient guard interval", 2005 IEICE Society Conference B-5-71 can be used. As shown in FIG. 8, however, the method disclosed in the above reference differs from this embodiment in that it assumes a propagation environment in which a delayed wave exceeds the guard interval of a preceding wave, and uses, for equalization, an interval, of an effective symbol interval, which includes no interference from the preceding symbol based on a delayed wave.

A method of demodulating an OFDM symbol from a signal corresponding to an interval portion of an OFDM symbol interval will be briefly described below.

First of all, the switch 7a connects to a filter bank 12. The filter bank 12 then extracts an interval, of the signal included in the interval "A", which has ½ length of the effective symbol length, and frequency-converts the signal included in the extracted interval. A maximum likelihood estimation unit 13 then generates, for each output from the filter bank 12, a plurality of replicas from a channel estimation value, the frequency characteristics of the filter bank, and subcarrier modulation signal candidates, and selects a replica which minimizes the error between itself and the filter bank output. The maximum likelihood estimation unit 13 further selects a subcarrier modulation signal from the selected replica. When the maximum likelihood estimation unit 13 selects a subcarrier modulation signal, a determination unit 14 performs bit determination processing, and the Viterbi decoding unit 11 performs error correction processing, thereby demodulating the original signal.

In the above case, frequency conversion is performed after the filter bank 12 extracts only one interval from the interval "A". As shown in FIG. 9, however, the filter bank 12 may extract a plurality of intervals from the interval "A" while temporally shifting the interval having ½ length of the effective symbol length ($\tau_1, \tau_2, \ldots, \tau_3$), and the maximum likelihood estimation unit 13 may obtain the error between a filter bank output and a replica for each of the extracted intervals and select a replica which minimizes the average of the errors.

As described above, demodulating an original signal from the interval "A" as part of an OFDM symbol in the "intermittent reception mode" and stopping the signal receiving operation in intervals other than the interval "A" can reduce the power consumption in intervals other than the interval "A". In this case, the power consumption of the frequency conversion unit 2 and A/D conversion unit 3 is about 10 times that of other units which process digital signals, and amounts to a major part of the total power consumption. Therefore, performing such intermittent receiving operation makes it possible to greatly reduce the power consumption of the signal reception apparatus.

Figure 10:
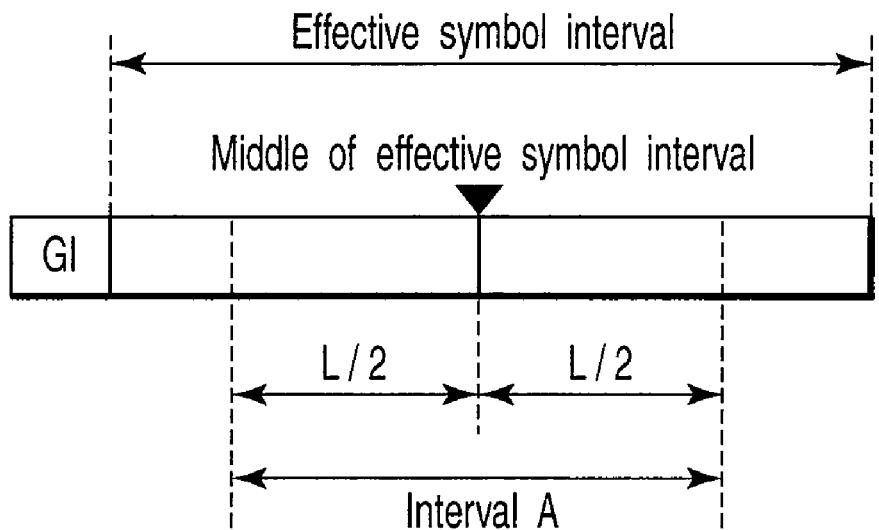
FIG. 10 is a view showing an example of how a signal reception interval is set in the first embodiment.

The interval setting method performed by the interval setting unit 5 will be described next with reference to FIG. 10.

The interval setting unit 5 sets, as the interval "A", an interval having an interval length "L" and including the middle of an interval, of the OFDM symbol interval, which excludes a guard interval, on the basis of a symbol synchronization signal. For example, as shown in FIG. 10, the interval setting unit 5 sets, as the interval "A", an interval including intervals, each having a length "L/2", on the two sides of the middle of an interval, of the OFDM symbol interval, which excludes a guard interval. Positioning the interval "A" at the middle portion of an interval excluding a guard interval makes it possible to prevent the occurrence of inter-symbol interference due to a synchronization offset because even if a symbol synchronization offset occurs due to a change in propagation environment after symbol synchronization is established, the receiving operation is robust against the influence of symbols transmitted before and after the OFDM symbol.

Figure 11:
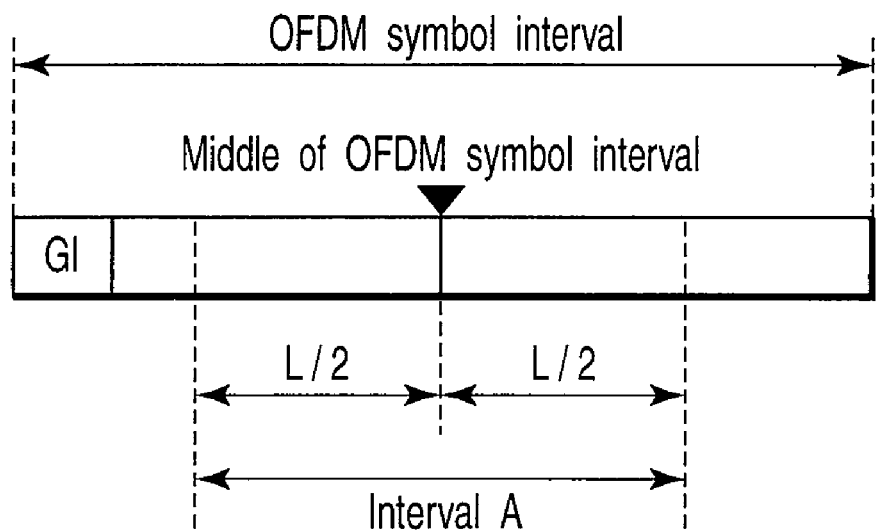
FIG. 11 is a view showing an example of how a signal reception interval is set in the first embodiment.

FIG. 11 is a view showing another interval setting method performed by the interval setting unit 5.

In the case shown in FIG. 11, the interval setting unit 5 sets, as the interval "A", an interval including intervals, each having a length "L/2", on the two sides of the middle of the OFDM symbol interval including a guard interval. This makes it possible to prevent, in particular, the occurrence of interference by a symbol transmitted after the OFDM symbol in a propagation environment in which the delay time of a delayed wave is short.

Figure 12:
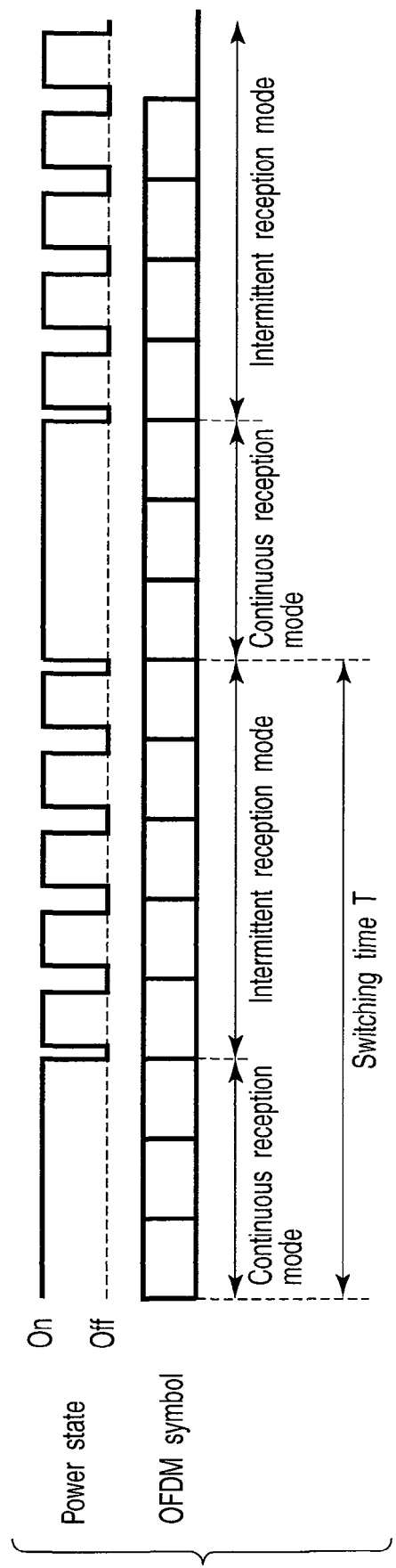
FIG. 12 is a view showing a mode switching method in the first embodiment.

The mode switching method performed by the interval setting unit 5 will be described next with reference to FIG. 12.

The interval setting unit 5 switches between the "intermittent reception mode" and the "continuous reception mode" for each predetermined time "T". As described above, in the "continuous reception mode", the symbol synchronization unit 50 performs symbol synchronization. For this reason, even if a symbol synchronization offset occurs due to, for example, a change in propagation environment, periodically switching between the "continuous reception mode" and the "intermittent reception mode" makes it possible to periodically perform symbol synchronization in the "continuous reception mode". In addition, it is preferable to set a large value as the switching time "T" between the "intermittent reception mode" and the "continuous reception mode", because this can obtain the effect of reducing power consumption in the "intermittent reception mode" for a long period of time.

The interval setting unit 5 preferably sets the switching time between the "intermittent reception mode" and the "continuous reception mode" and the interval length of the interval "A" in which a signal is received in the "intermittent reception mode" on the basis of the quality of the received OFDM signal which is measured by a quality measurement unit 15. The quality measurement unit 15 and the operation of the interval setting unit 5, which is based on the quality information measured by the quality measurement unit 15, will be described below.

The quality measurement unit 15 measures the quality of a received OFDM signal and sends the measured quality information to the interval setting unit 5. In this case, as the signal quality, one of the following is used: the received power of a demodulated signal, an EVM (Error Value Magnitude), the likelihood obtained by maximum likelihood estimation, and the like. The interval setting unit 5 receives the quality information sent from the quality measurement unit 15, and reflects the information in the switching time "T" between the modes. More specifically, if the signal quality input from the quality measurement unit 15 is low, the interval setting unit 5 sets the mode switching time "T" to a small value to frequently perform symbol synchronization in the "continuous reception mode" so as to avoid a deterioration in signal quality. If the signal quality is low, it suffices to set the interval length "L" to a large value. This increases the ability to reduce inter-Carrier interference, and hence can improve signal quality.

Note that the above embodiment has exemplified the case of stopping power supply to the frequency conversion unit 2 and the A/D conversion unit 3 in the intervals other than the intervals "A". However, it is possible to reduce power consumption by stopping power supply to even units designed to process digital signals (e.g., the filter bank 12, the maximum likelihood estimation unit 13, and the like) after the completion of demodulation processing.

The procedure of operation of the signal reception apparatus according to the first embodiment will be described with reference to FIG. 13. FIG. 13 is a flowchart showing the operation of the signal reception apparatus according to the first embodiment.

First of all, the interval setting unit 5 sets the "continuous reception mode" or the "intermittent reception mode" (step S101). When starting to receive a signal, the signal reception apparatus needs to perform symbol synchronization, and hence sets the "continuous reception mode".

When setting the "continuous reception mode", the apparatus receives an OFDM signal through the antenna 1 (step S102), and sends the received signal to the frequency conversion unit 2 and the A/D conversion unit 3. In the "continuous reception mode", the power control unit 6 supplies power to the frequency conversion unit 2 and the A/D conversion unit 3. These units therefore perform frequency conversion of the received signal (step S103) and A/D conversion (step S104).

The signal analog-to-digital-converted by the A/D conversion unit 3 is demodulated into an original signal through the FFT unit 8, complex division unit 9, determination unit 10, and Viterbi decoding unit 11 (step S105).

The signal analog-to-digital-converted by the A/D conversion unit 3 is also sent to the symbol synchronization unit 50 to be subjected to symbol synchronization (step S106). The interval setting unit 5 then sets the interval "A" in which a signal is received in the "intermittent reception mode" on the basis of the symbol-synchronized signal (step S107).

When a predetermined period of time has elapsed, the interval setting unit 5 switches from the "continuous reception mode" to the "intermittent reception mode" (step S101).

In the "intermittent reception mode", the power control unit 6 controls power supply to the frequency conversion unit 2 and the A/D conversion unit 3. That is, in the interval "A" in which a signal is received, the power control unit 6 supplies power to the frequency conversion unit 2 and the A/D conversion unit 3 to perform frequency conversion (step S109*a*) of a signal received by the antenna (step S108) and A/D conversion (step S109*b*). In an interval in which signal reception is stopped, the power control unit 6 stops power supply to the frequency conversion unit 2 and the A/D conversion unit 3 (step S109*c*).

This apparatus demodulates a signal in the "intermittent reception mode" by using the signal received in the interval "A" through the filter bank 12, maximum likelihood estimation unit 13, determination unit 14, and Viterbi decoding unit 11 (step S110).

When a predetermined period of time has elapsed, the interval setting unit 5 switches from the "intermittent reception mode" to the "continuous reception mode" and repeats the above operation.

The above is the procedure of operation of the signal reception apparatus according to the first embodiment.

Note that this signal reception apparatus can also be implemented by using, for example, a general-purpose computer apparatus as basic hardware. That is, the interval setting unit 5, power control unit 6, FFT unit 8, complex division unit 9, determination units 10 and 14, Viterbi decoding unit 11, filter bank 12, maximum likelihood estimation unit 13, quality measurement unit 15, and symbol synchronization unit 50 can be implemented by causing the processor mounted in the above computer apparatus to execute programs. In this case, the signal reception apparatus may be implemented by installing the above programs in the computer apparatus in advance or may be implemented by storing the above programs in a storage medium such as a CD-ROM or distributing them through a network and installing them in a computer apparatus as needed.

Second Embodiment

A signal reception apparatus according to the second embodiment will be described.

Figure 14:
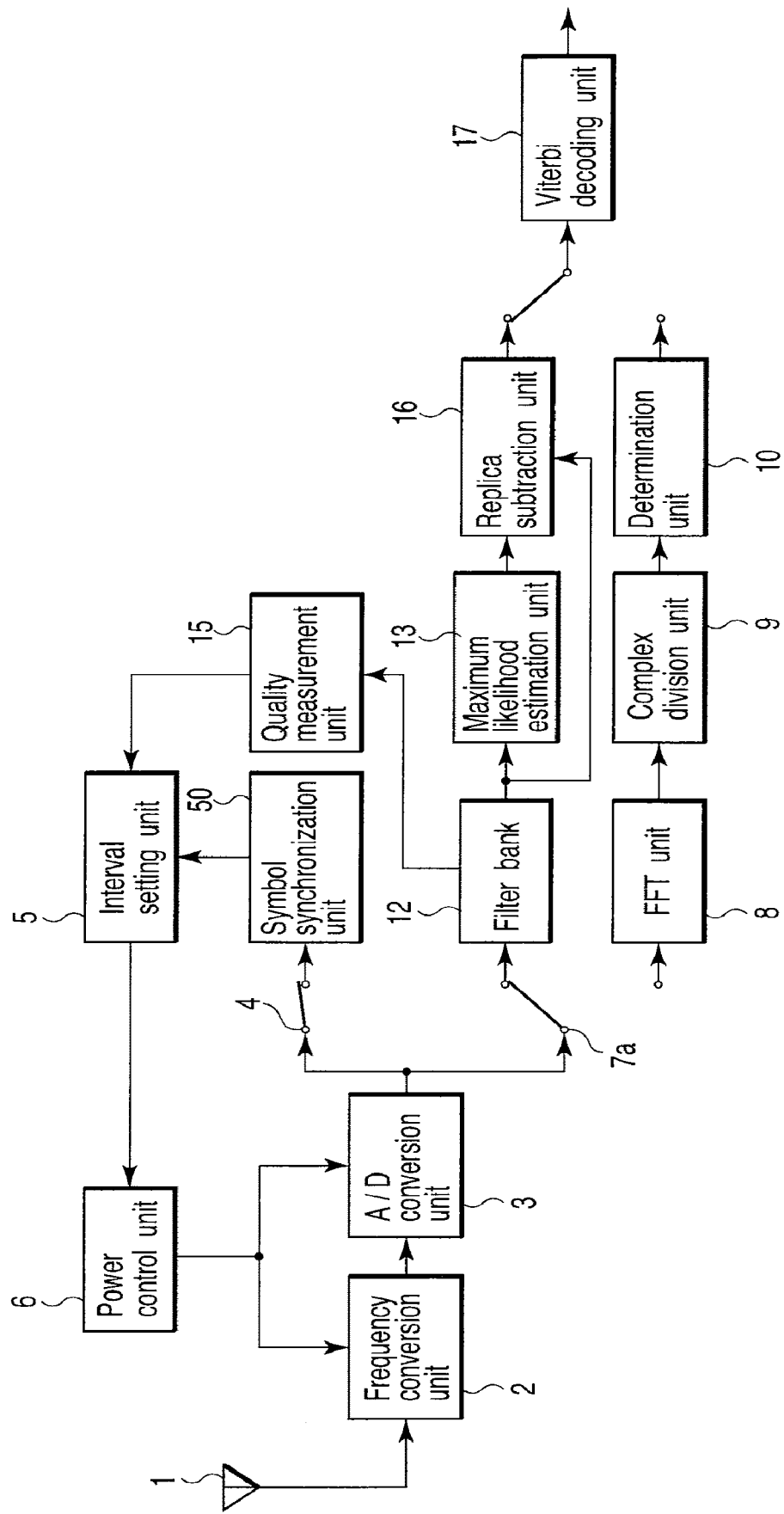
FIG. 14 is a block diagram showing the arrangement of a signal reception apparatus according to the second embodiment.

FIG. 14 is a block diagram showing the arrangement of the signal reception apparatus according to the second embodiment. The second embodiment differs from the first embodiment in a replica subtraction unit 16 and a Viterbi decoding unit 17.

In the "intermittent reception mode", the replica subtraction unit 16 subtracts, from a filter bank output, a replica component obtained by removing a component corresponding to a subcarrier as a demodulation target from the replica component selected by a maximum likelihood estimation unit 13. This generates a soft decision value with reduced inter-OFDM-subcarrier interference. The Viterbi decoding unit 17 receives the soft decision value, and performs soft decision Viterbi decoding processing.

As described above, the signal reception apparatus according to the second embodiment performs soft decision Viterbi decoding processing, and hence can calculate the path metric of Viterbi decoding in consideration of the influence of noise. This can improve the signal reception performance.

Third Embodiment

A signal reception apparatus according to the third embodiment will be described.

Figure 15:
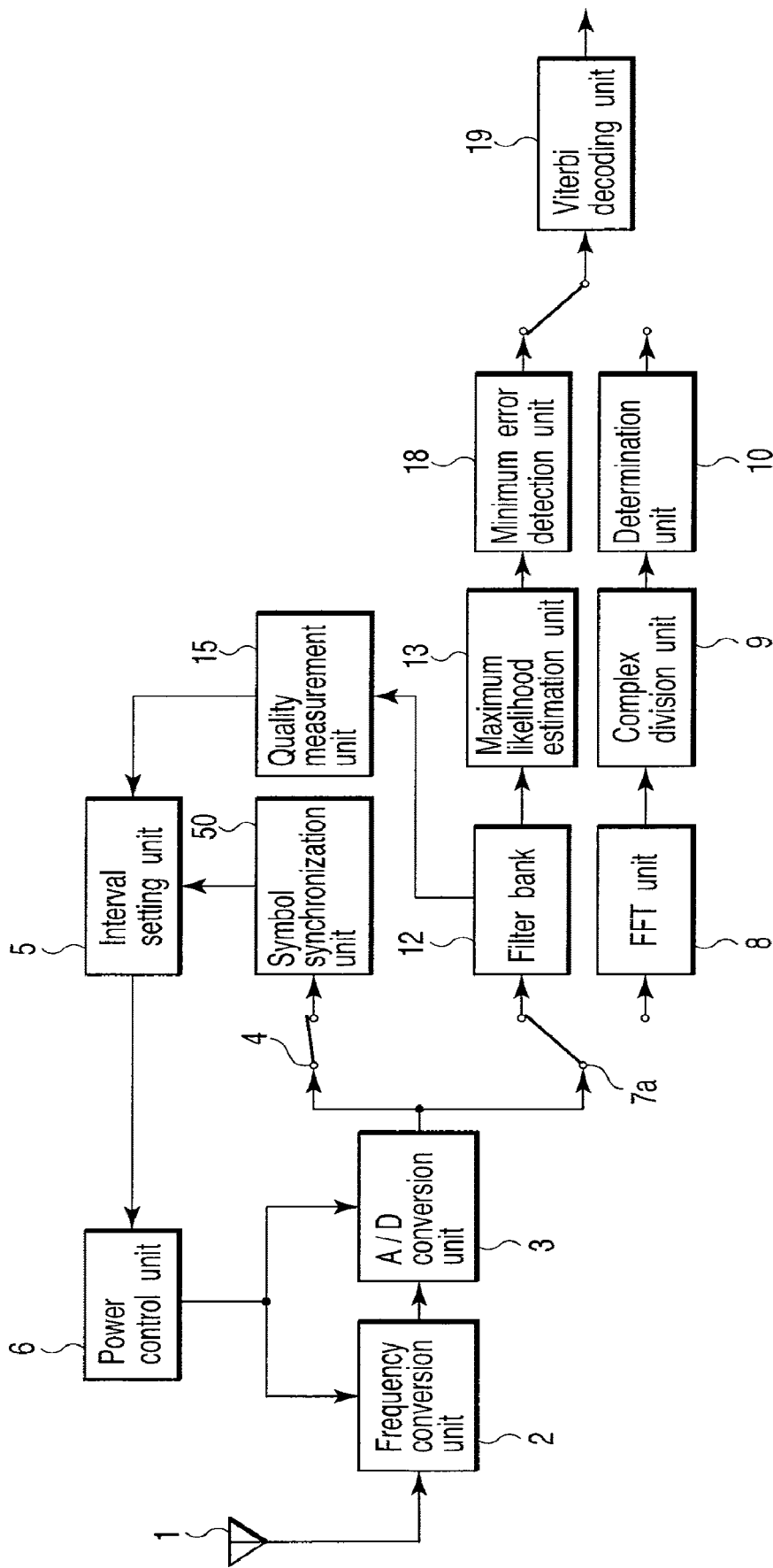
FIG. 15 is a block diagram showing the arrangement of a signal reception apparatus according to the third embodiment.

FIG. 15 is a block diagram showing the arrangement of the signal reception apparatus according to the third embodiment. The third embodiment differs from the first embodiment in a minimum error detection unit 18 and a Viterbi decoding unit 19.

In the "intermittent reception mode", the minimum error detection unit 18 detects the minimum value of errors which corresponds to each of modulation signal candidates of demodulation target subcarriers from the errors detected by a maximum likelihood estimation unit 13. This generates a metric for each of the modulation signal candidates. The Viterbi decoding unit 19 receives the metric and performs Viterbi decoding processing in consideration of a certain likelihood.

As described above, the signal reception apparatus according to the third embodiment performs Viterbi decoding processing in consideration of a certain likelihood, and hence can reduce the influence of low-reliability data when calculating the path metric of Viterbi decoding, thereby improving the signal reception performance.

Fourth Embodiment

A signal reception apparatus according to the fourth embodiment will be described.

Figure 16:
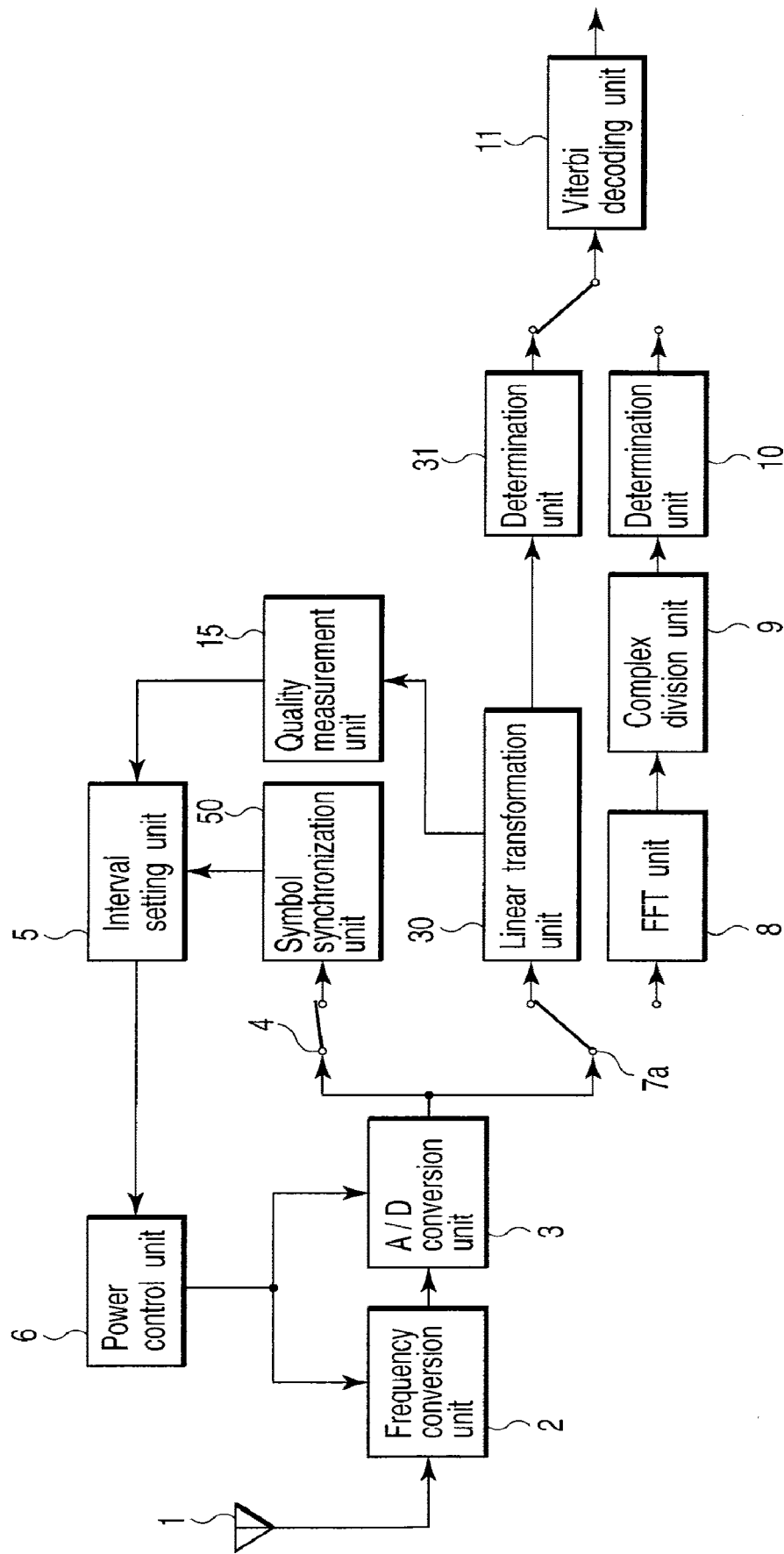
FIG. 16 is a block diagram showing the arrangement of a signal reception apparatus according to the fourth embodiment.

FIG. 16 is a block diagram showing the arrangement of the signal reception apparatus according to the fourth embodiment. The fourth embodiment differs from the first embodiment in a linear transformation unit 30 and a determination unit 31.

In the "intermittent reception mode", the linear transformation unit 30 receives a reception signal in the interval "A" (interval length "L") set by an interval setting unit 5, and performs linear transformation processing. The following is an example of linear transformation processing.

Letting N be an effective symbol length and M be the number of data subcarriers, a transmission signal s(n) (n=0, 1, . . . , L−1) corresponding to the interval "A" (interval length "L") of the effective symbol interval of an OFDM signal is given by equation (1). Assume that the interval length "L" is set to satisfy N>L≧M.

$$\begin{bmatrix} s(0) \\ s(1) \\ \vdots \\ s(L-1) \end{bmatrix} = \frac{1}{N} \begin{bmatrix} 1 & 1 & \cdots & 1 \\ 1 & \exp\left(j\frac{2\pi}{N}\right) & \cdots & \exp\left(j\frac{2\pi(M-1)}{N}\right) \\ \vdots & \vdots & \ddots & \vdots \\ 1 & \exp\left(j\frac{2\pi(L-1)}{N}\right) & \vdots & \exp\left(j\frac{2\pi(M-1)(L-1)}{N}\right) \end{bmatrix} \cdot \begin{bmatrix} x(0) \\ x(1) \\ \vdots \\ x(M-1) \end{bmatrix} \quad (1)$$

where x(k) represents, for example, a mapping point on an IQ constellation. Assume that x(k)=0 with respect to a subcarrier (k=M, M+1, . . . , N−1) to which no data is assigned.

Equation (2) is a matrix representation of equation (1).

$$S = A \cdot X \quad (2)$$

In this case, equation (3) provides a linear matrix for linear transformation according to this embodiment.

$$B = ((A \cdot E\{X \cdot X^H\} \cdot A^H + p_n I)^{-1} \cdot A \cdot E\{X \cdot X^H\})^H \quad (3)$$

where H represents complex conjugate transpose of a matrix, E{·} represents an expected value, I represents a unit matrix, and $p_n$ represents assumed noise power.

In this case, if it is assumed that x(0), x(1), . . . , x(M−1) are uncorrelated with each other, and $p_s$ represents the average power of a transmission signal, equation (4) is obtained.

$$B = ((p_s A \cdot A^H + p_n I)^{-1} \cdot p_s A)^H \quad (4)$$

In addition, assuming that $p_s=1$ and $p_n=0$, equation (5) can be obtained.

$$B = ((A \cdot A^H)^{-1} \cdot A)^H \quad (5)$$

In this case, the linear transformation performed by the linear transformation unit 30 is given by equation (6) using a linear matrix B. In this case, y(n) (n=0, 1, . . . , L−1) represents a reception signal corresponding to the transmission signal s(n). In addition, x'(n) (n=0, 1, . . . , M−1) represents an estimated value corresponding to a subcarrier modulation signal x(n) on the transmitting side.

$$\begin{bmatrix} x'(0) \\ x'(1) \\ \vdots \\ x'(M-1) \end{bmatrix} = B \cdot \begin{bmatrix} y(0) \\ y(1) \\ \vdots \\ y(L-1) \end{bmatrix} \quad (6)$$

In this manner, the linear transformation unit 30 performs linear transformation processing represented by equation (6), and the determination unit 31 receives the signal after linear transformation.

The determination unit 31 performs bit determination processing, and the Viterbi decoding unit 11 receives the signal after bit determination processing and decodes it.

The signal reception apparatus according to the fourth embodiment demodulates a reception signal by performing linear transformation processing, thereby performing processing equivalent to normal FFT processing by using a reception signal in the interval "A" and extracting the frequency component of the reception signal. This makes it possible to reduce the computation amount for demodulation.

Fifth Embodiment

A signal reception apparatus according to the fifth embodiment will be described.

Figure 17:
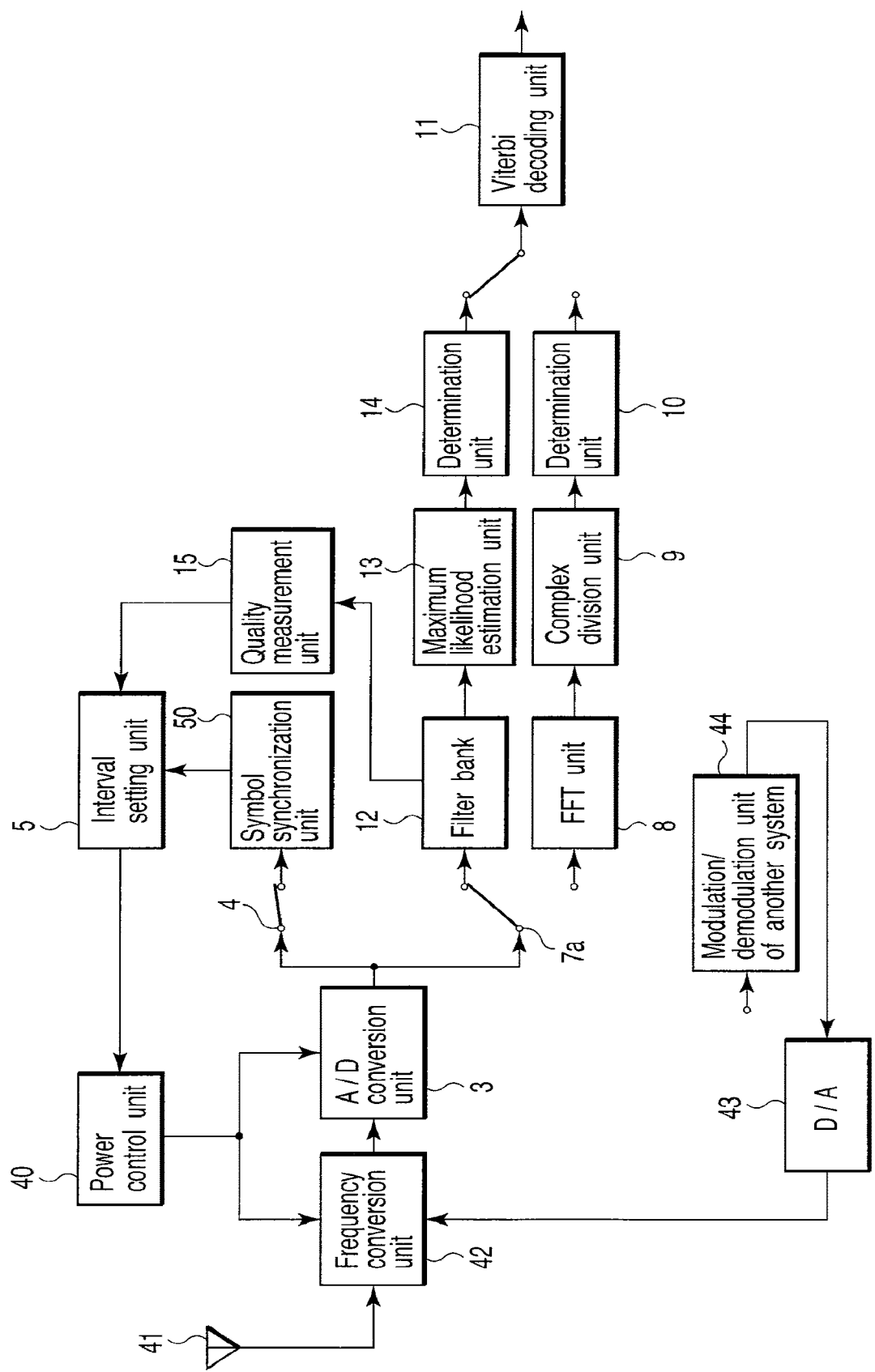
FIG. 17 is a block diagram showing the arrangement of a signal reception apparatus according to the fifth embodiment.

FIG. 17 is a block diagram showing the arrangement of the signal reception apparatus according to the fifth embodiment. The fifth embodiment differs from the first embodiment in a power control unit 40, an antenna 41, a frequency conversion unit 42, a D/A conversion unit 43, and a modulation/demodulation unit 44 of another communication system.

In the "intermittent reception mode", the signal reception apparatus according to this embodiment transmits/receives data to/from another radio communication system in an interval other than the interval "A". That is, in the antenna 41 and the frequency conversion unit 42, the frequency band of the carrier waves of OFDM signals transmitted/received by another radio communication system is set in an interval other than the interval "A". When another radio communication system is to perform reception in this interval, the antenna 41 receives a signal in the set frequency band. The received signal is sent to the demodulation unit 44 of another radio communication system through the frequency conversion unit 42, an A/D conversion unit 3, and a switch 7a. When transmission is to be performed in this interval, the D/A conversion unit 43 converts the signal transmitted from the modulation/demodulation unit 44 of another radio communication system to an analog signal, and the frequency conversion unit 42 performs frequency conversion. The resultant signal is transmitted from the antenna 41.

When data from another radio communication system is to be transmitted/received in an interval other than the interval "A" in this manner, the power control unit 40 continues power supply to the frequency conversion unit 42 and the A/D conversion unit 3. When data from another radio communication system is not to be transmitted/received in an interval other than the interval "A", the power control unit 40 stops power supply to the frequency conversion unit 42 and the A/D conversion unit 3, thereby reducing power consumption.

The signal reception apparatus according to the fifth embodiment can share the antenna 41, frequency conversion unit 42, and A/D conversion unit 3 with a different system, and hence can achieve reductions in power consumption and the cost of a radio communication system.

Sixth Embodiment

A signal reception apparatus according to the sixth embodiment will be described.

The signal reception apparatus of this embodiment will be described with reference to FIG. 18.

The signal reception apparatus of this embodiment differs from the apparatus of the first embodiment in that an interval designation unit 1801 is newly installed between an interval setting unit 5 and a symbol synchronization unit 50. This apparatus sets an intermittent reception interval at a forward position in accordance with an instruction from the interval designation unit 1801.

The interval designation unit 1801 receives a delay profile from the symbol synchronization unit 50, determines an intermittent reception interval, and transfers it to the interval setting unit 5. That is, the interval designation unit 1801 transfers a time width (called an interval length) $L_{ON}$ of the intermittent reception interval and the start time of the intermittent reception interval to the interval setting unit 5. Note that a delay profile indicates a specific time difference with which the signal reception apparatus has received a radio wave path. This embodiment will be described in detail with reference to FIG. 19.

Figure 19:
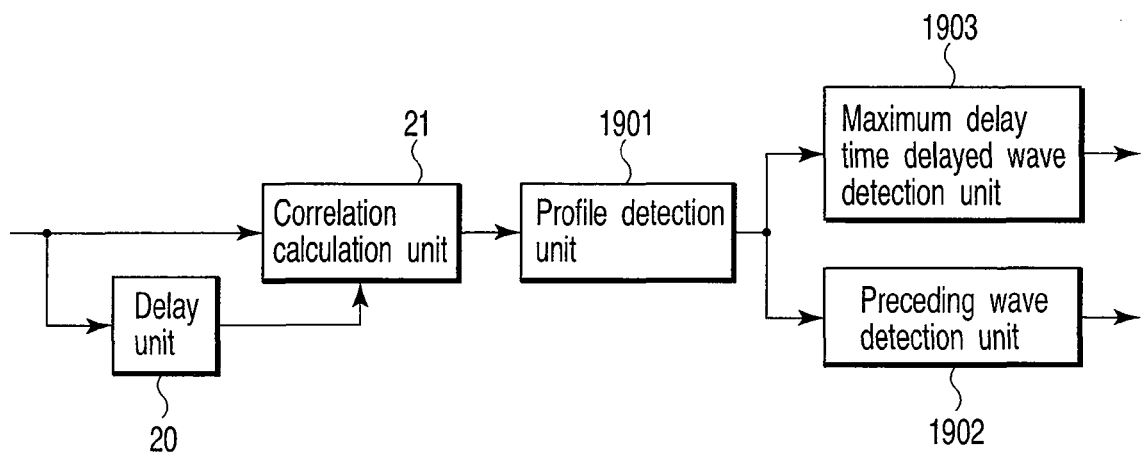
FIG. 19 is a block diagram showing the arrangement of a symbol synchronization unit in the sixth embodiment.

The symbol synchronization unit 50 and the interval designation unit 1801 in this embodiment will be described in detail with reference to FIG. 19.

The symbol synchronization unit 50 includes a delay unit 20, correlation calculation unit 21, profile detection unit 1901, preceding wave detection unit 1902, and maximum delay time delayed wave detection unit 1903.

The profile detection unit 1901 receives the correlation value between a reception signal and a delay signal, which is calculated by the correlation calculation unit 21, and detects a delay profile in which correlation value peaks periodically appear.

The preceding wave detection unit 1902 detects an effective symbol interval of a preceding wave. The preceding wave detection unit 1902 detects, for example, the head of an effective symbol interval of a preceding wave.

The maximum delay time delayed wave detection unit 1903 detects the time (maximum delay time) from the head of a delayed wave to the end of the delayed wave.

Figure 23:
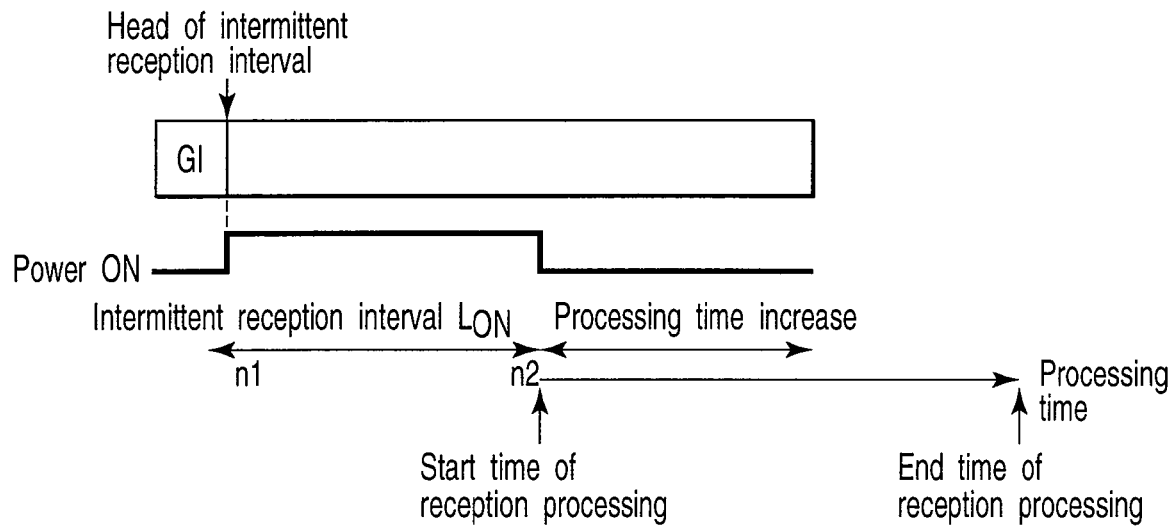
FIG. 23 is a view showing an example of the set position of an intermittent reception interval in the sixth embodiment.

(1) The interval designation unit 1801 sets the head of the effective symbol interval detected by the preceding wave detection unit 1902 as the start time of an intermittent reception interval. However, it suffices to set, as the start time of an intermittent reception interval, the time slightly shifted backward from the head of the effective symbol interval to provide a slight margin. The interval designation unit 1801 transfers the start time of this intermittent reception interval and the intermittent time width $L_{ON}$ to the interval setting unit 5. FIG. 23 corresponds to this operation.

Figure 22:
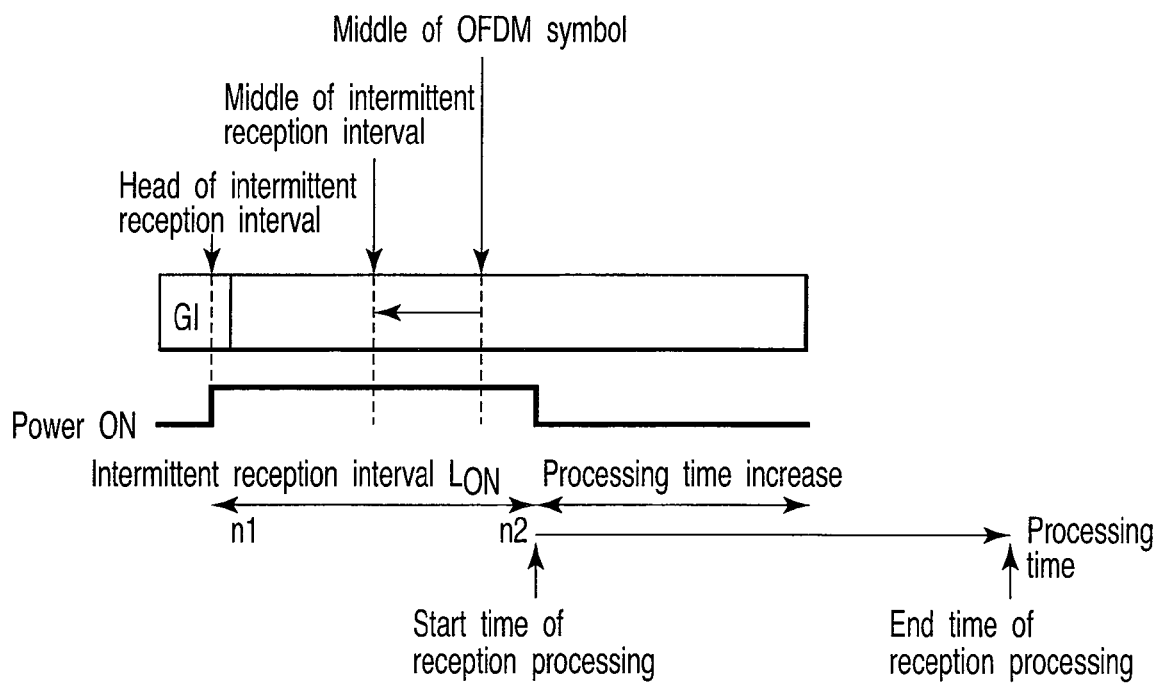
FIG. 22 is a view showing an example of the set position of an intermittent reception interval in the sixth embodiment.

(2) The interval designation unit 1801 determines whether the maximum delay time detected by the maximum delay time delayed wave detection unit 1903 is shorter than the guard interval. If the maximum delay time is shorter than the guard interval, the interval designation unit 1801 further measures by how much time the maximum delay time is shorter than the guard interval. In this case, the interval designation unit 1801 generates an instruction to shift the start position of the intermittent reception time forward from the end time of the guard interval by the measured time. That is, the interval designation unit 1801 generates an instruction to advance the start position of the intermittent reception interval from the end time of the guard interval by the measured time. Obviously, if the guard interval has a margin, the interval designation unit 1801 determines how much the maximum delay time is shorter than the time obtained by subtracting the margin from the guard interval. FIG. 22 corresponds this operation.

The interval designation unit 1801 generally performs processing (1) described above, and performs processing (2) described above in accordance with an instruction from a host unit. In addition, if it is determined that the delay spread of a propagation path is smaller than a given threshold, the interval designation unit 1801 may perform processing (2) described above; otherwise, the interval designation unit 1801 may perform processing (1) described above.

Figure 20:
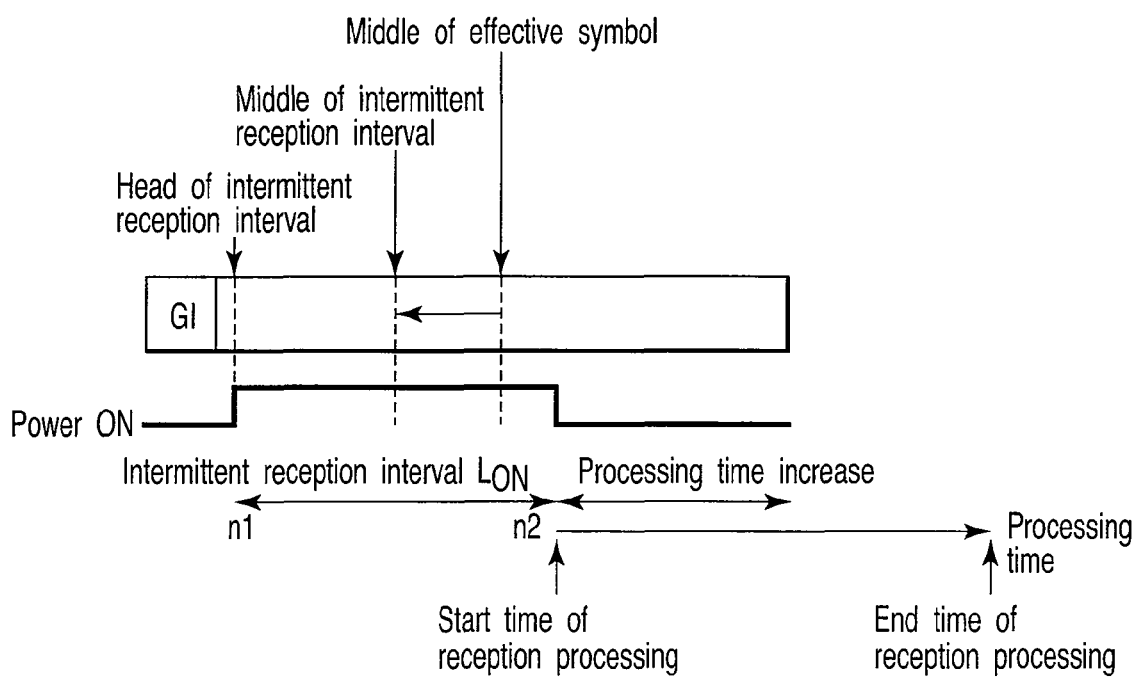
FIG. 20 is a view showing an example of the set position of an intermittent reception interval in the sixth embodiment.

An example of the set position of an intermittent reception interval will be described next with reference to FIG. 20. This example differs from the first embodiment in that an intermittent reception interval is set at a forward position.

In this embodiment, the interval setting unit 5 sets the time width $L_{ON}$ of an intermittent reception interval to an interval having an interval length $L_{ON}$, which has its center located forward from the middle of an effective symbol interval of an interval having a length $L_{FFT}$ obtained by excluding a guard interval from one OFDM interval. Limiting an intermittent reception interval at a forward position in an effective symbol interval can allocate, as a signal processing time, an interval of the effective symbol interval which is not included in the intermittent reception interval. This makes it possible to perform high-performance signal processing and improve the reception performance. In other words, in a situation where predetermined reception performance is obtained, if the apparatus can perform high-performance signal processing, an intermittent reception interval can be shortened accordingly.

Limiting an intermittent reception interval at a forward position in an effective symbol interval can increase the signal processing time and allow high-performance signal processing. This makes it possible to improve the reception performance and to narrow the intermittent reception interval accordingly. Therefore, the power consumption of the radio unit and/or A/D converter can be further reduced. Although the power consumption of the signal processing unit increases as the signal processing time increases, since the power consumption of the signal processing unit is as low as about 1/10 that of the radio unit and A/D converter, the overall power consumption of the signal reception apparatus can be reduced.

Another effect is that when the contents of signal processing to be performed remain the same, since there is some margin in terms of processing time, the apparatus can perform serial processing instead of parallel processing which has been performed in the prior art to complete processing on time. This makes it possible to reduce the circuit size, i.e., the chip size, of the signal processing unit and the chip cost.

Figure 21:
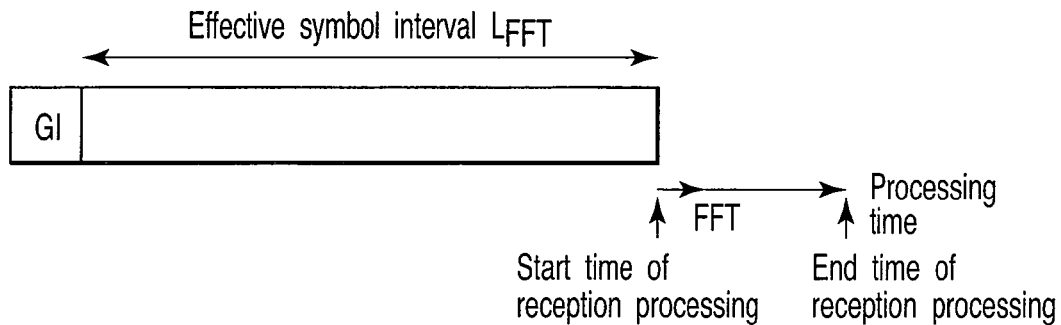
FIG. 21 is a view showing the timing of reception processing in the prior art.

For comparison, an example of the start time of reception processing in a conventional reception apparatus will be described with reference to FIG. 21. In the prior art, the apparatus starts signal processing at the same time as the end of an effective symbol interval. In contrast, in this embodiment, the apparatus starts signal processing at the same time as the end of an intermittent reception time set at a forward position in an effective symbol interval. That is, this embodiment starts signal processing earlier than the prior art.

An example of the set position of an intermittent reception interval corresponding to the case of processing (2) described above will be described next with reference to FIG. 22.

Referring to FIG. 22, an intermittent reception interval is set to an interval having the interval length $L_{ON}$, which has its center located forward from the middle of one OFDM symbol interval.

This makes it possible to set the start time of the intermittent reception interval at a forward position up to the guard interval and hence to perform higher-performance signal processing. This can improve the reception performance, and hence can narrow the intermittent reception interval accordingly. Therefore, the overall power consumption of the signal reception apparatus can be reduced. When the delay spread of a propagation path is small, in particular, this technique is effective because no inter-symbol interference occurs.

An example of the set position of an intermittent reception interval corresponding to the case of processing (1) described above will be described next with reference to FIG. 23.

Referring to FIG. 23, an intermittent reception interval is set to an interval having the interval length $L_{ON}$, which has a start time at the head of an interval, of one OFDM symbol interval, which excludes a guard interval, i.e., an effective symbol interval. Unlike in the case shown in FIG. 23, it suffices to set, as the start time of the intermittent reception interval, a position slightly shifted from the end time of the guard interval into the effective symbol interval.

This prevents the head of an intermittent reception interval from entering a guard interval regardless of the length of the intermittent reception interval. Since system design is generally performed to prevent the delay time of a delayed wave from exceeding a guard interval, no inter-symbol interference occurs.

A specific example of high-performance signal processing, which can be implemented by further adding, to the signal processing time, a time produced by limiting an intermittent reception interval to a forward position in an effective symbol interval will be described below.

An example of an MLSE equalizer (the filter bank 12 and the maximum likelihood estimation unit 13) which performs high-performance signal processing in this embodiment will be described with reference to FIG. 24. For the sake of simplicity, FIG. 24 shows only three FFT outputs.

Assume that an intermittent reception interval n satisfies $n_1 \leq n \leq n_2$. In this case, the intermittent reception interval length $L_{ON}$ is given by $L_{ON} = n_2 - n_1 + 1$. It is preferable to set the intermittent reception interval length $L_{ON}$ to a size equal to or more than 70% of an FFT size $L_{FFT}$.

Note that an IFFT (inverse fast Fourier transform) at an $L_{FFT}$ point is given by the following equation:

$$x(n) = \frac{1}{L_{FFT}} \sum_{k=0}^{L_{FFT}-1} X(k) e^{\frac{j2\pi nk}{L_{FFT}}} \tag{7}$$

where X(k) is a modulation signal for the kth subcarrier. Subsequently, a guard interval having a length $L_{CP}$ is inserted in the head of an IFFT output.

$$x'(n) = \begin{cases} x(n) & 0 \leq n \leq L_{FFT} - 1 \\ x(L_{FFT} + n) & -L_{CP} \leq n \leq -1 \end{cases} \tag{8}$$

A reception signal in an intermittent reception interval is given by the following equation. This reception signal is input to the filter bank 12.

$$y(n) = \frac{1}{L_{FFT}} \sum_{k=0}^{L_{FFT}-1} H(k) X(k) e^{\frac{j2\pi nk}{L_{FFT}}} \tag{9}$$

where H(k) is the channel response of the kth subcarrier. For the sake of simplicity, noise is neglected.

Referring to FIG. 24, first of all, the filter bank 12 at the $L_{FFT}$ point receives a reception signal in an intermittent reception interval. In this case, since the reception signal is at the $L_{ON}$ point, 0 is input to the $L_{FFT}$-$L_{ON}$ point. In this embodiment, although no window is explicitly provided for FFT processing, it can be thought that the embodiment provides rectangular window $w_n = 1$ with a length $L_{ON}$. For this reason, an FFT output will be referred to as a filter bank output. A filter bank output is given by equation (10) below:

$$Z(m) = \sum_{n=0}^{L_{ON}-1} \left( w_n \frac{1}{L_{FFT}} \sum_{k=0}^{L_{FFT}-1} H(k)X(k) e^{\frac{j2\pi nk}{L_{FFT}}} \right) e^{\frac{-j2\pi mn}{L_{FFT}}} \tag{10}$$

$$= \frac{1}{L_{FFT}} \sum_{k=0}^{L_{FFT}-1} \left( \sum_{n=0}^{L_{ON}-1} w_n e^{\frac{-j2\pi(m-k)n}{L_{FFT}}} \right) H(k)X(k)$$

$$= \frac{1}{L_{FFT}} \sum_{k=0}^{L_{FFT}-1} \left( \sum_{n=0}^{L_{FFT}-1} w'_n e^{\frac{-j2\pi(m-k)n}{L_{FFT}}} \right) H(k)X(k) e^{\frac{j2\pi \tau_p k}{L_{FFT}}}$$

$$= \frac{1}{L_{FFT}} \sum_{k=0}^{L_{FFT}-1} W(m-k) H(k) X(k)$$

where W(k) is a frequency characteristic of $w'_n$, which is given by equation (11) below:

$$w' = \begin{cases} w_n & 0 \leq n \leq L_{ON} - 1 \\ 0 & L_{ON} \leq n \leq L_{FFT} - 1 \end{cases} \tag{11}$$

In this case, if $L_{ON}$ is set to an odd-numbered sample, the coefficients $w'_n$ of the window function of the filter bank can be made vertically symmetrical. Therefore, the frequency characteristic of the filter bank can be represented by a real number. As will be described later, since the frequency characteristic of the filter bank is used to generate a replica, allowing the frequency characteristic of the filter bank to be represented by a real number makes it possible to reduce the circuit size for replica generation.

Subsequently, MLSEs 2410, 2411, and 2412 are applied to a filter bank output to demodulate the signal. With the frequency characteristic of the window function, only adjacent subcarrier components spaced apart by α components filter in each filter bank output. Equation (10) given above can therefore be rewritten into equation (12):

$$Z(m) = \frac{1}{L_{FFT}} \sum_{k=m-\alpha}^{m+\alpha} W(m-k)H(k)X(k) \qquad (12)$$

According to the above equation, a replica in an MLSE is given by:

$$\hat{Z}(m) = \frac{1}{L_{FFT}} \sum_{k=m-\alpha}^{m+\alpha} W(m-k)\hat{H}(k)\hat{X}(k) \qquad (13)$$

In this case, $\hat{H}(k)$ and $\hat{X}(k)$ respectively represent channel estimation value and modulation signal candidates in the kth subcarrier. An error in a replica with respect to a filter bank output is given by $$\epsilon(m)=Z(m)-\hat{Z}(m) \qquad (14)$$

By using mathematical expression (14), $2\alpha+1$ subcarriers are estimated, and the mth subcarrier is output as a demodulated signal.

This embodiment performs estimation by using mathematic expression (15) to reduce the computation amount of an MLSE.

$$\hat{Z}(m) = \frac{1}{L_{FFT}} \sum_{k=m-\beta}^{m+\beta} W(m-k)\hat{H}(k)\hat{X}(k) \qquad (15)$$

where $\beta$ is a value smaller than $\alpha$ ($\beta<\alpha$). Using mathematical expression (15) will narrow the range of adjacent subcarrier components to be considered in an MLSE, and hence the estimation accuracy deteriorates due to the influence of the residual components of ($\beta-\alpha$) adjacent subcarriers.

Figure 25:
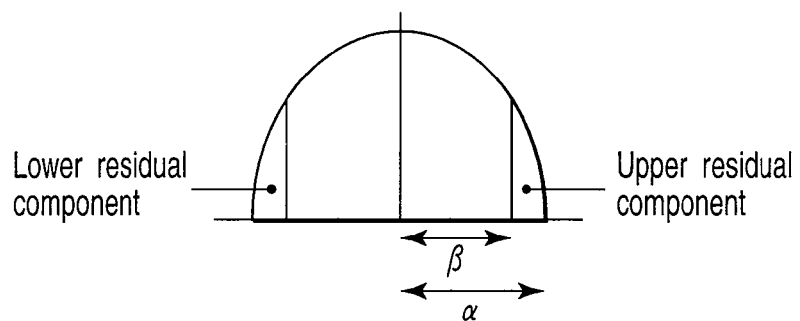
FIG. 25 is a view showing the influences of residual components.

FIG. 25 is a view showing the influence of residual components. In this case, an estimated value from an MLSE is not used as a definite value but is used as a tentative decision value. That is, residual subcarrier components are calculated by using an estimated value from the MLSE and are subtracted from a filter bank output. Upper replica generating units 2404, 2405, and 2406 generate upper components, and lower replica generating units 2407, 2408, and 2409 generate lower components. A filter bank output from which residual ICI components are removed is given by equation (16):

$$Z'(m)=Z(m)-\hat{Z}^{(l)}(m)-\hat{Z}^{(u)}(m) \qquad (16)$$

In this case, $\hat{Z}^{(l)}(m)$ and $\hat{Z}^{(u)}(m)$ respectively represent a lower residual ICI and an upper residual ICI, which are given by equation (17) below:

$$\hat{Z}^{(l)}(m) = \frac{1}{L_{FFT}} \sum_{k=m-\alpha}^{m-\beta-1} W(m-k)\hat{H}(k)\hat{X}^{(m-1)}(k) \qquad (17)$$

$$\hat{Z}^{(u)}(m) = \frac{1}{L_{FFT}} \sum_{k=m+\beta+1}^{m+\alpha} W(m-k)\hat{H}(k)\hat{X}^{(m+1)}(k)$$

In this case, $\hat{X}^{(m-1)}(k)$ $\hat{X}^{(m+1)}(k)$ represent signal components estimated by the MLSE in adjacent filter banks Z(m−1) and Z(m+1).

Subtraction units 2413, 2414, and 2415 give reliability weights to a filter bank output Z'(m) from which a residual ICI component is removed on the basis of the magnitude of the mth channel estimation value given by $\hat{H}(m)$ For example, if a modulated signal is a QPSK signal, the weight given by equation (18) is attached to the signal.

$$Z''(m) = Z'(m)\frac{|\hat{H}(m)|}{\hat{H}(m)} \qquad (18)$$

The above equation can be considered as the soft decision value of a filter bank output. The soft decision value is input to a soft decision Viterbi decoder, which outputs error-corrected decoded bits.

First Modification

As shown in FIG. 26, in mathematical expressions (17), $\hat{Z}^{(l)}(m)$ and $\hat{Z}^{(u)}(m)$ can be assigned with reliability weights by error units 2601, 2602, and 2603 on the basis of the magnitudes of errors $\epsilon(m-1)$ and $\epsilon(m+1)$ corresponding to Z(m−1) and Z(m+1). For example, the weights given by equations (19) and (20) below are assigned.

$$\hat{Z}'^{(l)}(m)=\hat{Z}^{(l)}(m)\times(1-\epsilon(m-1)) \qquad (19)$$

$$\hat{Z}'^{(u)}(m)=\hat{Z}^{(u)}(m)\times(1-\epsilon(m+1)) \qquad (20)$$

In some cases, subtracting a replica component with a large error from a filter bank may cause a deterioration in characteristics. For this reason, when a replica component has a large error, the component to be subtracted from a filter bank is reduced. This makes it possible to improve the reception performance.

Second Modification

As shown in FIG. 27, a re-modulation unit 2702 re-demodulates a modulated signal by using an output from a Viterbi decoder 2701 to obtain $\bar{X}(k)$ With the use of $\bar{X}(k)$ mathematical expressions (17) is modified into equations (21) given below. The upper replica generating units 2404, 2405, and 2406 and the lower replica generating units 2407, 2408, and 2409 then generate and subtract residual components to perform soft decision Viterbi decoding again.

$$\hat{Z}^{(l)}(m) = \frac{1}{L_{FFT}} \sum_{k=m-\alpha}^{m-\beta-1} W(m-k)\hat{H}(k)\overline{X}(k) \quad (21)$$

$$\hat{Z}^{(u)}(m) = \frac{1}{L_{FFT}} \sum_{k=m+\beta+1}^{m+\alpha} W(m-k)\hat{H}(k)\overline{X}(k)$$

With this operation, since the probability of an error in a signal after error correction is low, subtracting a signal component after error correction from a filter bank makes it possible to improve the reception performance. Another effect is that combining the error correction processing with equalization processing can improve the reception performance while reducing the circuit size by decreasing the equalization performance of the equalization processing.

Third Modification

Figure 28:
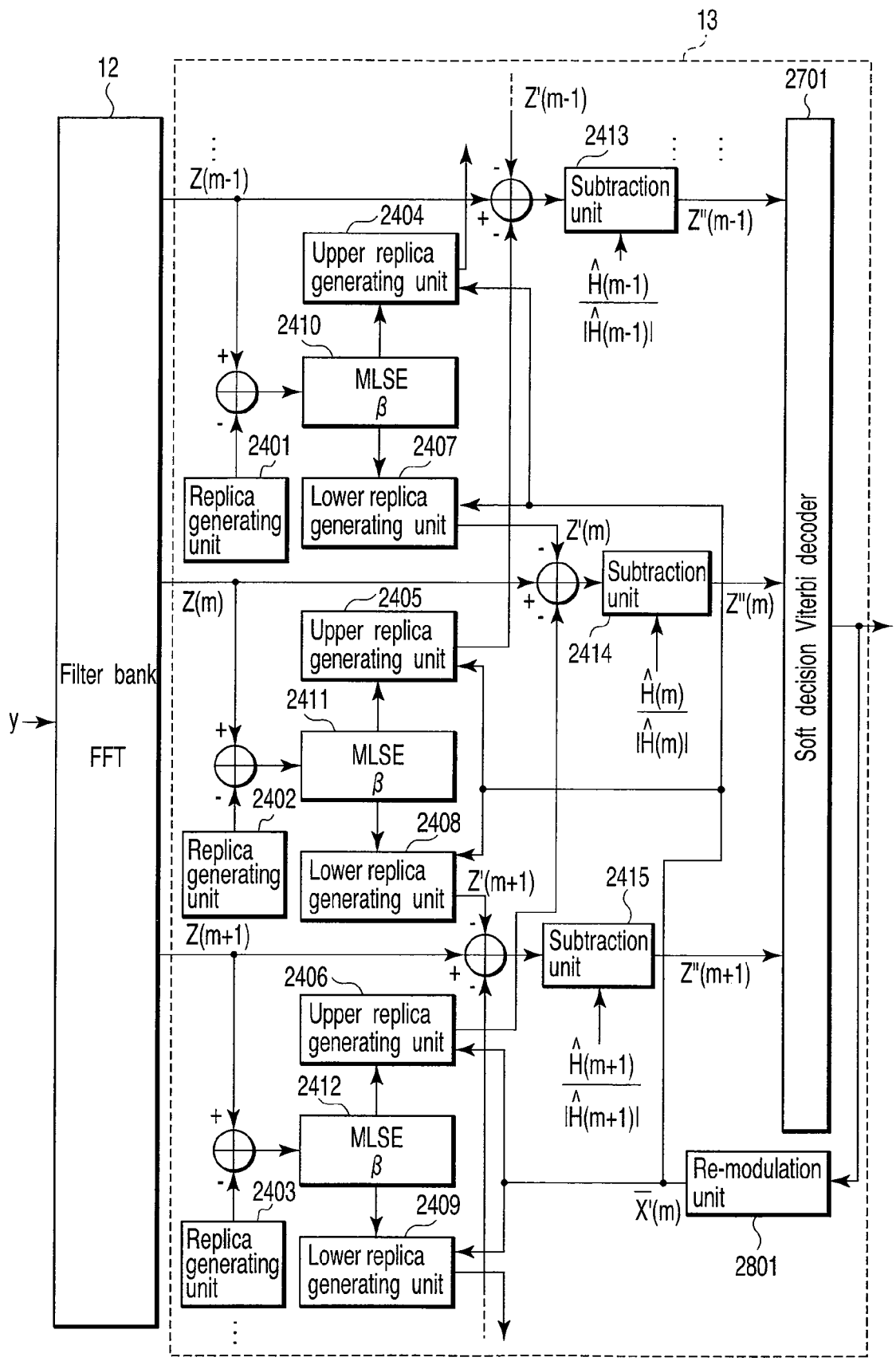
FIG. 28 is a block diagram showing the arrangement of an MLSE equalizer which performs high-performance signal processing according to the third modification of the sixth embodiment.

As shown in FIG. 28, a re-modulation unit 2801 re-modulates a modulated signal by using likelihood information corresponding to each output from a Viterbi decoder 2701, and obtains $\overline{X}'(k)$ With the use of $\overline{X}'(k)$ mathematical expressions (17) is modified as follows. Upper replica generating units 2404, 2405, and 2406 and lower replica generating units 2407, 2408, and 2409 then generate and subtract residual components to perform soft decision Viterbi decoding again.

$$\hat{Z}^{(l)}(m) = \frac{1}{L_{FFT}} \sum_{k=m-\alpha}^{m-\beta-1} W(m-k)\hat{H}(k)\overline{X}'(k) \quad (22)$$

$$\hat{Z}^{(u)}(m) = \frac{1}{L_{FFT}} \sum_{k=m+\beta+1}^{m+\alpha} W(m-k)\hat{H}(k)\overline{X}'(k)$$

In some case, subtracting a replica component with a large error from a filter bank may cause a deterioration in characteristics. For this reason, when a replica component has a large error, the component to be subtracted from a filter bank is reduced. This makes it possible to improve the reception performance.

Fourth Modification

Figure 29:
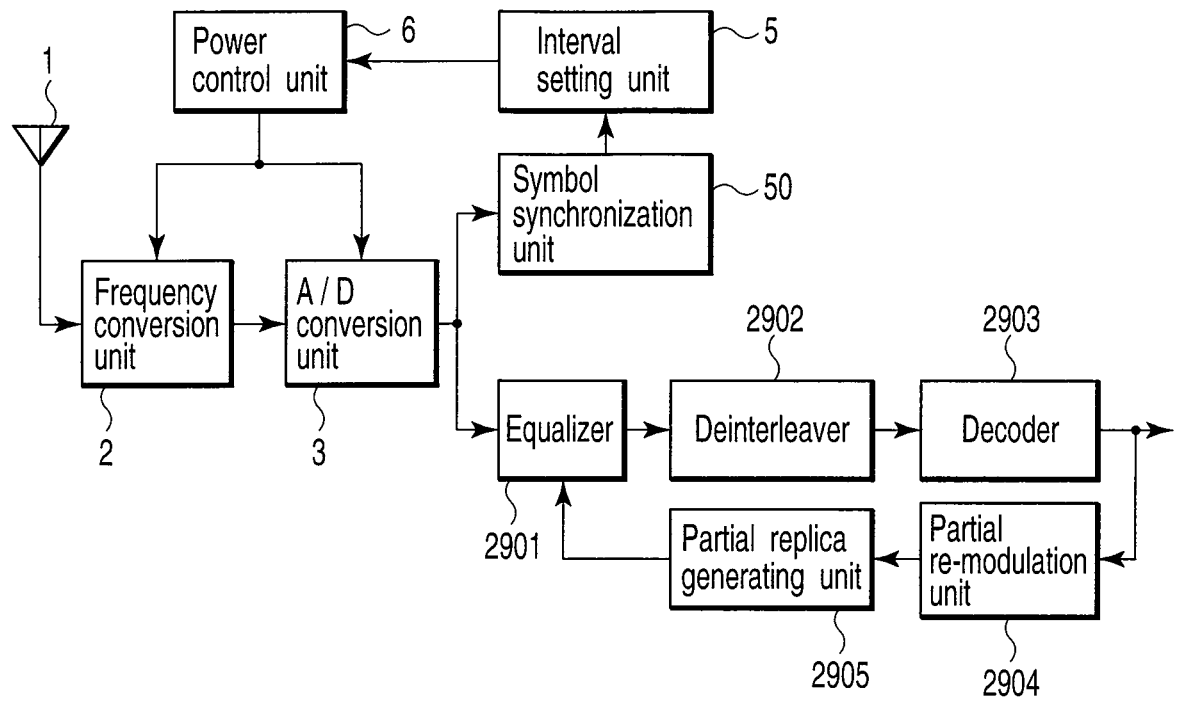
FIG. 29 is a block diagram showing the arrangement of a signal reception apparatus according to the fourth modification of the sixth embodiment.

As shown in FIG. 29, this modification includes a deinterleaver 2902 on the input side of a decoder 2903, and a partial re-modulation unit 2904 generates signal components, of signal components excluding signal component corresponding to demodulation target subcarriers, which have undergone error correction processing. A partial replica generating unit 2905 receives the signal components, generates residual components, and generates a soft decision value by subtracting them from a filter bank output. The decoder 2903 performs error correction again by using the generated soft decision value.

The following effects can be obtained by this processing. In general, when the transmitting side includes an interleaver which interchanges the order of signal sequences, the receiving side includes a deinterleaver which restores the order of signal sequences, and an error correction unit receives data after the processing performed by the deinterleaver. In this case, error-corrected signals corresponding to the current OFDM signal include signals to be output immediately and signals to be output after several symbols. Therefore, it takes a period of time corresponding to several symbols to acquire all error-corrected signals corresponding to one OFDM signal. Using only signals to be output immediately makes it possible to shorten the processing time and improve the reception performance.

Figure 30:
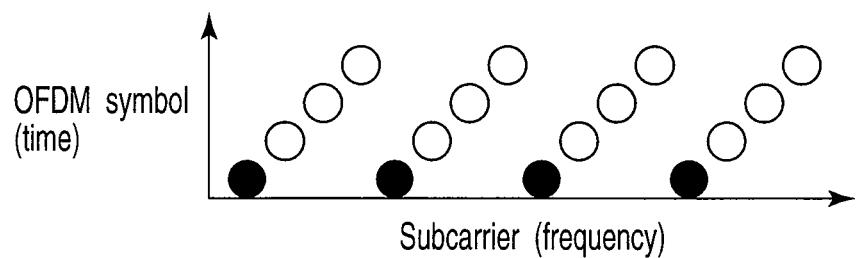
FIG. 30 is a view showing an example of the number of symbols required until the acquisition of all error-corrected signals corresponding to one OFDM signal.

FIG. 30 shows an example of the number of symbols required until error-corrected signals corresponding to one OFDM signal in a system including an interleaver. In this case, one OFDM signal contains 16 subcarriers. Circles represent the timings when error-corrected signals corresponding to the respective subcarriers are output. Therefore, it takes a period of time corresponding to four symbols to acquire all signals. For this reason, the subcarrier components indicated by the bullets are input to the partial re-modulation unit 2904.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal reception apparatus comprising:
   an antenna which receives an OFDM (Orthogonal Frequency Division Multiplex) signal;
   a frequency conversion unit configured to perform frequency conversion on the received OFDM signal to obtain a converted OFDM signal;
   an analog-to-digital (A/D) conversion unit configured to perform analog-to-digital conversion on the converted OFDM signal to obtain a first digital OFDM signal;
   a setting unit configured to set a first interval of one OFDM symbol interval of the OFDM signal;
   a demodulation unit configured to demodulate an OFDM symbol from a second digital OFDM signal corresponding to the first interval, the second digital OFDM signal being included in the first digital signal; and
   a power control unit configured to control power supply to the frequency conversion unit and the A/D conversion unit in the first interval, and stop the power supply to at least one of the frequency conversion unit and the A/D conversion unit in a second interval other than the first interval.

2. The apparatus according to claim 1, wherein the setting unit is configured to set an interval length of the first interval to not less than ½ interval length of an interval which is included in one OFDM symbol interval and excludes a guard interval.

3. The apparatus according to claim 1, further comprising an instruction unit configured to instruct the setting unit to set, as the first interval, an interval having a predetermined interval length which has a center located forward from a middle of an interval which is included in one OFDM symbol interval and excludes a guard interval.

4. The apparatus according to claim 3, wherein the setting unit is configured to set an interval length of the first interval to not less than ½ interval length of an interval which is included in one OFDM symbol interval and excludes a guard interval.

5. The apparatus according to claim 1, further comprising an instruction unit configured to instruct the setting unit to set, as the first interval, an interval having a predetermined interval length which has a center located forward from a middle of an interval which is included in one OFDM symbol interval and includes a guard interval.

6. The apparatus according to claim 5, wherein the setting unit is configured to set an interval length of the first interval to not less than ½ interval length of an interval which is included in one OFDM symbol interval and excludes a guard interval.

7. The apparatus according to claim 1, further comprising an instruction unit configured to instruct the setting unit to set, as the first interval, an interval having a predetermined interval length which has, as a start of the interval, a head of an interval which is included in one OFDM symbol interval and excludes a guard interval.

8. The apparatus according to claim 7, wherein the setting unit is configured to set an interval length of the first interval to not less than ½ interval length of an interval which is included in one OFDM symbol interval and excludes a guard interval.

9. The apparatus according to claim 1, wherein the demodulation unit includes a frequency transformer to perform frequency transform on an OFDM signal corresponding to a third interval having an interval length which is included in the first interval of the digital OFDM signal to obtain a plurality of filter bank outputs, a generator to generate a plurality of replicas from a channel estimation value, a frequency characteristic of a filter bank, and subcarrier modulation signal candidates for the filter bank outputs, a selector to select a replica which has a minimizing one of errors between the replica and the filter bank outputs for the filter bank outputs to obtain a minimum replica, a selector to select a subcarrier modulation signal from the minimum replica for the filter bank outputs to obtain a selected modulation signal, and a demodulator to demodulate the OFDM symbol by using the selected modulation signal.

10. The apparatus according to claim 9, wherein the setting unit is configured to set a length of the first interval to an odd numbered sample.

11. The apparatus according to claim 9, wherein the demodulation unit includes an extractor to extract a plurality of third intervals each being the third interval from the first interval, an error detector to, when the replica is to be selected, obtain errors between the filter bank outputs obtained for each extracted interval and the generated replica for each third interval, and a selector to select a replica which minimizes a sum of the errors.

12. The apparatus according to claim 11, wherein the setting unit is configured to set a length of the first interval to an odd numbered sample.

13. The apparatus according to claim 1, wherein the demodulation unit includes a frequency transformer to perform frequency transform on an OFDM signal corresponding to a third interval having an interval length which is included in the first interval of the digital OFDM signal to obtain a plurality of filter bank outputs, a first generator to generate a plurality of replicas from a channel estimation value, a frequency characteristic of a filter bank, and subcarrier modulation signal candidates for the filter bank outputs, a selector to select a replica which has a minimizing one of errors between the filter bank outputs and the replica for the filter bank outputs to obtain a minimum replica, a second generator to generate, for the filter bank outputs, a soft decision value by subtracting, from each filter bank output, a component which is one of components contained in a minimum replica and excludes a component corresponding to a demodulation target subcarrier, and a demodulator to demodulate the OFDM symbol by using the soft decision value.

14. The apparatus according to claim 13, wherein the setting unit is configured to set a length of the first interval to an odd numbered sample.

15. The apparatus according to claim 13, further comprising a level adjustment unit configured to perform level adjustment on a component to be subtracted from each filter bank output in accordance with a magnitude of an error in the corresponding replica.

16. The apparatus according to claim 13, wherein the demodulation unit further comprises an error correction unit configured to perform error correction, and a subtracter to subtract, from each filter bank output, a component which is one of error corrected signal components and excludes a component corresponding to a demodulation target subcarrier to obtain the soft decision value, and the error correction unit performs error correction again by using the generated soft decision value.

17. The apparatus according to claim 16, wherein the demodulation unit further comprises a deinterleaver on an input side of the error correction unit, which is configured to generate a soft decision value by subtracting, from each filter bank output, a signal component which is one of signal components excluding a signal component corresponding to a demodulation target subcarrier and has undergone error correction processing, and the error correction unit performs error correction again by using the generated soft decision value.

18. The apparatus according to claim 1, wherein the demodulation unit includes a frequency transformer to perform frequency transform on an OFDM signal corresponding to a third interval having an interval length which is included in the first interval of the digital OFDM signal to obtain a plurality of filter bank outputs, a generator to generate a plurality of replicas from a channel estimation value, a frequency characteristic of a filter bank, and subcarrier modulation signal candidates for the filter bank outputs, a calculator to calculate a plurality of errors between the filter bank outputs and the replica for the filter bank outputs to obtain a minimum value of an error corresponding to each of subcarrier modulation signal candidates as demodulation targets from the errors, and a demodulator to demodulate the OFDM symbol by using the minimum value.

19. The apparatus according to claim 18, wherein the setting unit is configured to set a length of the first interval to an odd numbered sample.

* * * * *